(12) United States Patent
Ota

(10) Patent No.: US 8,468,827 B2
(45) Date of Patent: Jun. 25, 2013

(54) SOLAR THERMAL ELECTRIC POWER GENERATION SYSTEM AND HEATING MEDIUM SUPPLY SYSTEM

(75) Inventor: Hideaki Ota, Ibaraki (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 1113 days.

(21) Appl. No.: 12/376,758

(22) PCT Filed: Oct. 20, 2006

(86) PCT No.: PCT/JP2006/320906
§ 371 (c)(1),
(2), (4) Date: Apr. 8, 2009

(87) PCT Pub. No.: WO2007/074570
PCT Pub. Date: Jul. 5, 2007

(65) Prior Publication Data
US 2010/0175365 A1   Jul. 15, 2010

(30) Foreign Application Priority Data
Aug. 10, 2006  (JP) ................. 2006-218330

(51) Int. Cl.
*B60K 16/00* (2006.01)
*F03G 6/00* (2006.01)
*F02C 6/00* (2006.01)

(52) U.S. Cl.
USPC ............. 60/641.8; 60/641.15; 60/39.182

(58) Field of Classification Search
USPC ............. 60/641.1, 641.8, 39.182, 398, 641.9, 60/641.11, 641.12, 641.13, 641.14, 641.15
See application file for complete search history.

(56) References Cited

U.S. PATENT DOCUMENTS

| | | | |
|---|---|---|---|
| 4,095,428 A * | 6/1978 | Warren | 60/641.8 |
| 4,158,291 A * | 6/1979 | Jones | 60/641.1 |
| 4,896,507 A * | 1/1990 | Hosford | 60/641.8 |
| 5,444,972 A * | 8/1995 | Moore | 60/39.182 |
| 5,727,379 A | 3/1998 | Cohn | |
| 5,755,102 A * | 5/1998 | Assaf et al. | 60/641.8 |
| 5,775,107 A * | 7/1998 | Sparkman | 60/641.8 |
| 5,806,317 A | 9/1998 | Kohler et al. | |
| 6,141,949 A * | 11/2000 | Steinmann | 60/772 |
| 6,158,237 A * | 12/2000 | Riffat et al. | 62/484 |

FOREIGN PATENT DOCUMENTS

| | | |
|---|---|---|
| EP | 0526816 | 2/1993 |
| JP | 51-30943 | 5/1976 |
| JP | 54-052851 | 4/1979 |
| JP | 61-261678 | 11/1986 |

* cited by examiner

*Primary Examiner* — Gerald Sung
(74) *Attorney, Agent, or Firm* — Alleman Hall McCoy Russell & Tuttle LLP

(57) ABSTRACT

A heating medium supply system is provided which is capable of sufficiently suppressing a temperature fluctuation of a heating medium, by the time when a heat exchanging device recovers heat of the heating medium, by leveling the temperature fluctuation fluctuating inevitably with time. The heating medium supply system includes: a heat collecting unit configured to heat a liquid heating medium by sunlight; a heat exchanging device configured to heat water supplied thereto by means of the heating medium supplied thereto from the heat collecting unit; heating medium supply piping for supplying the heating medium from the heat collecting unit to the heat exchanging device; and a heating medium heater for heating the heating medium and a temperature measuring device configured to measure a temperature of the heating medium, which are provided on the heating medium supply piping.

17 Claims, 18 Drawing Sheets

SOLAR THERMAL ELECTRIC POWER GENERATION SYSTEM AND HEATING MEDIUM SUPPLY SYSTEM

TECHNICAL FIELD

The present invention relates to a solar thermal electric power generation system, including integrated solar combined cycle electric power generation, and a heating medium supply system. More specifically, the present invention relates to a solar thermal electric power generation system configured to generate steam by means of a heating medium heated by solar heat and drive a steam turbine by means of steam thus generated to generate electric power and a heating medium supply system used to serve various purposes such as to generate steam to be supplied to such a solar thermal electric power generation system.

BACKGROUND ART

A conventional solar thermal electric power generation system 101 shown in FIG. 15 has a configuration wherein sunlight is collected by means of a concentrating type of heat collecting unit (hereinafter referred to as simply "heat collecting unit") 102, a heating medium absorbs collected sunlight as thermal energy, and the heating medium is supplied to a heat exchanging device 103 to generate steam by utilizing heat of the heating medium. Saturated steam generated by the heat exchanging device 103 is then superheated by means of a superheater 104. A steam turbine 105 is driven by such superheated steam to generate electric power. In the figure, reference characters 106 and 107 denote an electricity generator and a condenser, respectively.

Methods of collecting incidental solar radiation are roughly classified into a central receiver type and a parabolic trough type. The heat collecting unit 102 of the parabolic trough type uses trough-shaped reflectors 102a having a parabolic section in an X-Y plane and configured to reflect sunlight thereon to collect them on its focal point. Heat absorbing tubes 108 each extending through the focal points of reflectors 102a along the Z-axis allow a heating medium to pass therethrough to collect solar heat. The heat absorbing tubes 108 and heating medium supply piping 109 connected thereto allow the heating medium to circulate between a heat exchanging device and the heat collecting unit. A special synthetic oil is generally used as the heating medium. For example, The heating medium absorbs solar heat to reach a high-temperature condition of about 400° C., releases heat to generate steam in the heat exchanging device 103 thereby to assume a low-temperature condition of about 300° C., and returns to the heat collecting unit 102.

As can be seen from FIG. 16, a plot of the solar energy density variance during one day, the conventional solar thermal electric power generation system can operate only during day time from sunrise to sunset. For this reason, the system is stopped at night and restarted the next morning. FIG. 16 plots the solar energy density variance during one day at a region in North Africa. Curves plotting mean energy densities in July and December are shown in FIG. 16, and curves plotting mean energy density variance in other months are considered to fall within the range between the two curves shown.

As shown, the intensity of solar thermal energy reaching the heat collecting unit 102 varies from zero to maximum during one day. Therefore, the electric power generation system 101 is usually designed to have such a capacity as to generate electric power at a mean solar energy intensity level. As is often the case, the system 101 is designed to store surplus energy in excess of a mean solar energy intensity level as thermal energy in a large-scale and expensive heat storage system 110 and release heat thus stored to generate steam as sunset approaches, thereby making it possible to continue electric power generation. However, in actuality limitations on the system investment cost and running cost limit the heat storage capacity to about 4 to 6 hours in terms of electric power generating duration and, therefore, electric power generation cannot continue day and night.

In an attempt to solve this problem, for example, European Patent Laid-Open Publications Nos. 0750730 and 0526816 have proposed integrated solar combined cycle electric power generation systems in each of which the above-described steam turbine electric power generation relying upon solar heat is combined with the gas turbine combined cycle electric power generation. Such a new concept of a solar thermal electric power generation system is intended to generate electric power even during nighttime or cloudy days, during which solar heat cannot be utilized, by a combination of the gas turbine electric power generation with the steam turbine electric power generation by utilizing steam generated in a waste heat recovery boiler. The system thus configured can be expected to continue electric power generation day and night. Also, the integrated system can reduce the fuel consumption of the gas turbine; hence, the carbon-dioxide emission amount can be reduced by the maximum use of solar heat.

However, such an integrated solar combined cycle electric power generation system includes a heat collecting unit configured to generate saturated steam directly from water and supply it to a steam turbine without using a special heating medium or a heat exchanging device. This kind of electric power generation system according to the aforenoted European Patent Laid-Open Publication No. 0750730 is configured to mix saturated steam with steam generated from a high-pressure turbine for superheating the saturated steam before supplying it to the steam turbine. On the other hand, another kind of electric power generation system according to the aforenoted European Patent Laid-Open Publication No. 0526816 is configured to mix saturated steam with steam generated from a high-pressure turbine and then superheat the saturated steam by means of a reheater of the waste heat recovery boiler before supplying it to the steam turbine.

Irrespective of the conventional solar thermal electric power generation system and the integrated solar combined cycle electric power generation system, there exists an unavoidable problem that relates to the condition of solar radiation onto the surface of the Earth incidentally changing (with time) during daytime. In the solar heat collecting unit, heat transfer from solar heat to steam or other heating medium is mostly based on solar radiation condition. Accordingly, the temperature of steam or other heating medium absorbing solar heat fluctuates in exact response to changes in the condition of sunshine onto the surface of the Earth as a natural phenomenon. Since such a fluctuation occurs according to nature, it is difficult to accurately predict the time at which the fluctuation occurs and the degree of the fluctuation. As a result, the condition of steam (including temperature, pressure, wetness, dryness and the like) to be supplied to the steam turbine fluctuates, which causes the generated electric power to fluctuate. If a vigorous fluctuation occurs in the condition of steam, the waste heat recovery boiler or the steam turbine may be damaged thereby.

With the two systems disclosed in the aforenoted Laid-Open Publications Nos. 0750730 and 0526816, for example, the condition of steam (including temperature, pressure, dryness and the like) generated in a heat absorbing tube associated with the heat collecting unit fluctuates and steam loses its heat while being fed from the heat collecting unit to the steam turbine. As a result, the system according to the Laid-Open Publication No. 0750730 causes the condition of steam to fluctuate after mixing with the steam generated from the high-pressure turbine. The system according to the Laid-Open Publication No. 0526816 causes the condition of steam to fluctuate at the inlet side of the reheater thereby giving influence on the waste heat recovery boiler. That is, when the sunshine condition fluctuates largely or frequently, the condition of steam generated in the heat collecting unit fluctuates likewise, which makes it difficult for the whole of the solar thermal combined cycle electric power generation system to serve continuously for safe operation.

Such a fluctuation in sunshine conditions, which is caused by clouds, a sandstorm or a like factor, causes the amount of collected heat to decrease steeply. Further, when each of the aforementioned reflectors is bent by wind incidentally, sunlight cannot be sufficiently concentrated on the aforementioned heat absorbing tube. This also causes a fall of the temperature of the heating medium or the like. Since such a temperature fall possibly occurs at short intervals, a required amount of heat cannot be timely taken out of the aforementioned heat storage system in a short time, hence, the stored heat cannot be utilized to effectively suppress the temperature fluctuations of the heating medium.

DISCLOSURE OF INVENTION

Problem to be Solved by Invention

The present invention has been made in order to solve such problems. Accordingly, it is an object of the present invention to provide a heating medium supply system which, even if a heating medium under supply in a solar thermal electric power generation system fluctuates with time in its temperature, is capable of supplying the heating medium having a temperature fluctuation which is sufficiently suppressed through lessening or eliminating the temperature fluctuations by the time of supplying heat for steam generation. It is another object of the present invention to provide a solar thermal electric power generation system which is capable of turning steam having been generated by solar heat into a stabilized superheated condition and then supplying such steam to a steam turbine.

Means for Solving Problem

In order to attain the aforementioned objects, the present invention provides a heating medium supply system comprising:

a heating system configured to heat a liquid heating medium by sunlight;

a heat exchanging device configured to heat water supplied thereto by means of the heating medium supplied thereto from the heating system;

a heating medium supply passage for supplying the heating medium from the heating system to the heat exchanging device; and a heater for heating the heating medium and a temperature measuring device configured to measure a temperature of the heating medium, which are provided on the heating medium supply passage.

With this arrangement, even if the heating medium supplied from the heating system fluctuates in its temperature, it is possible to heat the heating medium by means of the heater when the temperature of the heating medium is low before supplying the heating medium to the heat exchanging device and, hence, the heating medium reaching the heat exchanging device has a lessened temperature fluctuation.

The heater may be configured to operate so that the temperature of the heating medium to be measured by the temperature measuring device does not fall below a predetermined temperature.

The heating medium supply system may have an arrangement wherein:

the heating medium supply passage is provided with a temperature fluctuation suppressing device for suppressing a temperature fluctuation of the heating medium;

the temperature fluctuation suppressing device has plural heating medium passages allowing the heating medium to pass therethrough, and an inlet and an outlet for the heating medium, whereby the heating medium flowing into the temperature fluctuation suppressing device from the heating medium supply passage through the inlet is allowed to pass through the plural heating medium passages with time-lags to form respective streams, which are then joined together before flowing out of the temperature fluctuation suppressing device into the heating medium supply passage through the outlet.

The liquid heating medium continuously supplied through the heating medium supply passage flows into the temperature fluctuation suppressing device and passes through the plural heating medium passages to form respective streams. The streams outgoing from the respective passages are time-lag mixed together when joined together. Even when the temperature of the heating medium fluctuates, the time-lag mixing step makes it possible to reduce the range of the temperature fluctuation as well as to lower the temperature fluctuation speed. As a result, the condition of steam generated by heat of the heating medium is uniformalized throughout the operation time. "Time-lag mixing", as used herein, means a mixing of the heating medium that continuously flows into the temperature fluctuation suppressing device at time-lags, with heating medium that resides in the temperature fluctuation suppressing device after having already flowed thereinto.

The aforementioned heater may have plural heating medium passages allowing the heating medium to pass therethrough, an inlet and an outlet for the heating medium, and heating means for heating the heating medium passing through the plural heating medium passages, whereby the heating medium flowing into the heater from the heating medium supply passage through the inlet is allowed to pass through the plural heating medium passages at time-lags to form respective streams, which are then joined together before flowing out of the heater into the heating medium supply passage through the outlet. This heating medium heater is preferable because the heater is capable of heating as well as time-lag mixing the heating medium at the same time.

A solar thermal electric power generation system according to the present invention comprises a steam turbine;

a heating medium supply system having a heat exchanging device for generating steam to be supplied to the steam turbine and configured to supply the heat exchanging device with a heating medium for heating water therein; and a steam supply passage for supplying steam from the heat exchanging device to the steam turbine, wherein the heating medium supply system is any one of the heating medium supply systems described above.

With this solar thermal electric power generation system, the heating medium supply system continuously supplies the heating medium in a stabilized temperature condition with its temperature fluctuation being suppressed. For this reason, the heat exchanging device can generate saturated steam in a stabilized steam condition (including temperature, pressure and wetness).

The solar thermal electric power generation system described above may further comprise a gas turbine and a waste heat recovery boiler configured to generate steam by utilizing waste heat of the gas turbine and supply steam thus generated to the steam turbine, wherein the waste heat recovery boiler comprises an evaporating section having a steam drum and a superheating section, and steam generated by heating of water supplied to the waste heat recovery boiler is supplied to the steam turbine. The solar thermal electric power generation system thus constructed is what is called an integrated solar combined cycle electric power generation system. This electric power generation system is capable of supplying the steam turbine with stabilized steam generated by the heat exchanging device of the aforementioned heating medium supply system and stabilized steam generated by the waste heat recovery boiler.

The solar thermal electric power generation system may have an arrangement wherein: the steam supply passage interconnects the heat exchanging device of the heating medium supply system and the steam drum to allow steam from the heat exchanging device and steam generated by the waste heat recovery boiler to be mixed together in the steam drum and then supplied to the steam turbine through the superheating section. This arrangement allows the superheating section of the waste heat recovery boiler to superheat saturated steam from the heat exchanging device together with steam generated by the waste heat recovery boiler.

The solar thermal electric power generation system may have an arrangement wherein: the evaporating section and the superheating section are interconnected through a steam passage provided with a steam mixer; and the steam supply passage interconnects the heat exchanging device of the heating medium supply system and the steam mixer to allow steam from the heat exchanging device and steam generated by the waste heat recovery boiler to be mixed together in the steam mixer and then supplied to the steam turbine through the superheating section. Like the former arrangement, this arrangement allows the superheating section of the waste heat recovery boiler to superheat saturated steam from the heat exchanging device together with steam generated by the waste heat recovery boiler.

The superheating section of the waste heat recovery boiler may be provided with a burner for heating steam. Even when saturated steam fed to the superheating section of the waste heat recovery boiler fluctuates in its condition, this arrangement makes it possible to lessen a wetness fluctuation of steam or obtain dry steam by heating steam of high wetness by means of the burner.

The solar thermal electric power generation system may have an arrangement wherein: the aforementioned steam supply passage is branched into a first steam passage connected to the waste heat recovery boiler and a second steam passage connected to the steam turbine without passing through the waste heat recovery boiler; and the second steam passage is provided with a superheating device for superheating steam. This arrangement allows the waste heat recovery boiler to superheat saturated steam from the heat exchanging device of the heating medium supply system while superheating saturated steam by means of the superheating device separately provided. Therefore, even if the gas turbine or the waste heat recovery boiler stops operating, the solar thermal electric power generation system can maintain electric power generation as long as solar heat can be collected.

An integrated solar combined cycle electric power generation system according to the present invention comprises:
a steam turbine;
a gas turbine;
a waste heat recovery boiler configured to generate steam by utilizing waste heat of the gas turbine to generate steam and supply steam thus generated to the steam turbine;
a heating medium supply system having a heat exchanging device for generating steam to be supplied to the steam turbine and configured to supply the heat exchanging device with a heating medium for heating water therein;
a steam supply passage for supplying steam from the heat exchanging device to the steam turbine; and
a steam fluctuation suppressing device provided on the steam supply passage for suppressing a fluctuation of steam condition, wherein:
the steam fluctuation suppressing device has plural steam passages allowing steam to pass therethrough, and an inlet and an outlet for steam, whereby steam flowing into the steam fluctuation suppressing device from the steam supply passage through the inlet is allowed to pass through the plural steam passages at time-lags to form respective streams, which are then joined together before flowing out of the steam fluctuation suppressing device into the steam supply passage through the outlet; and
the heating medium supply system further comprises a heating system configured to heat a liquid heating medium, and a heating medium supply passage for supplying the heating medium from the heating system to the heat exchanging device.

In this integrated solar combined cycle electric power generation system, the heating medium supply system may be any one of the heating medium supply systems described above.

The integrated solar combined cycle electric power generation system may have an arrangement wherein:
the waste heat recovery boiler comprises an evaporating section having a steam drum and a superheating section;
the steam supply passage interconnects the heat exchanging device of the heating medium supply system and the steam drum to allow steam from the heat exchanging device and steam generated by the waste heat recovery boiler to be mixed together in the steam drum and then supplied to the steam turbine.

The integrated solar combined cycle electric power generation system may have an arrangement wherein:
the waste heat recovery boiler comprises an evaporating section having a steam drum, and a superheating section;
the evaporating section and the superheating section are interconnected through a steam passage provided with a steam mixer; and
the steam supply passage interconnects the heat exchanging device of the heating medium supply system and the steam mixer to allow steam from the heat exchanging device and steam generated by the waste heat recovery boiler to be mixed together in the steam mixer and then supplied to the steam turbine.

The superheating section of the waste heat recovery boiler may be provided with a burner for heating steam.

The integrated solar combined cycle electric power generation system may have an arrangement wherein:
the aforementioned steam supply passage is branched into a first steam passage connected to the waste heat recovery boiler and a second steam passage connected to the steam turbine without passing through the waste heat recovery boiler; and the second steam passage is provided with a superheating device for superheating steam.

Advantage of Invention

According to the present invention, it is possible to suppress or lessen a temperature fluctuation of a heating medium to be supplied to a heat exchanging device with its temperature fluctuating in such a system as a solar thermal electric power generation system. Also, the present invention makes it possible to suppress a fluctuation of steam condition to be supplied to a steam turbine effectively.

BEST MODE FOR CARRYING OUT THE INVENTION

Embodiments of an integrated solar combined cycle electric power generation system and a heating medium supply system according to the present invention are described with reference to the attached drawings.

Figure 1:
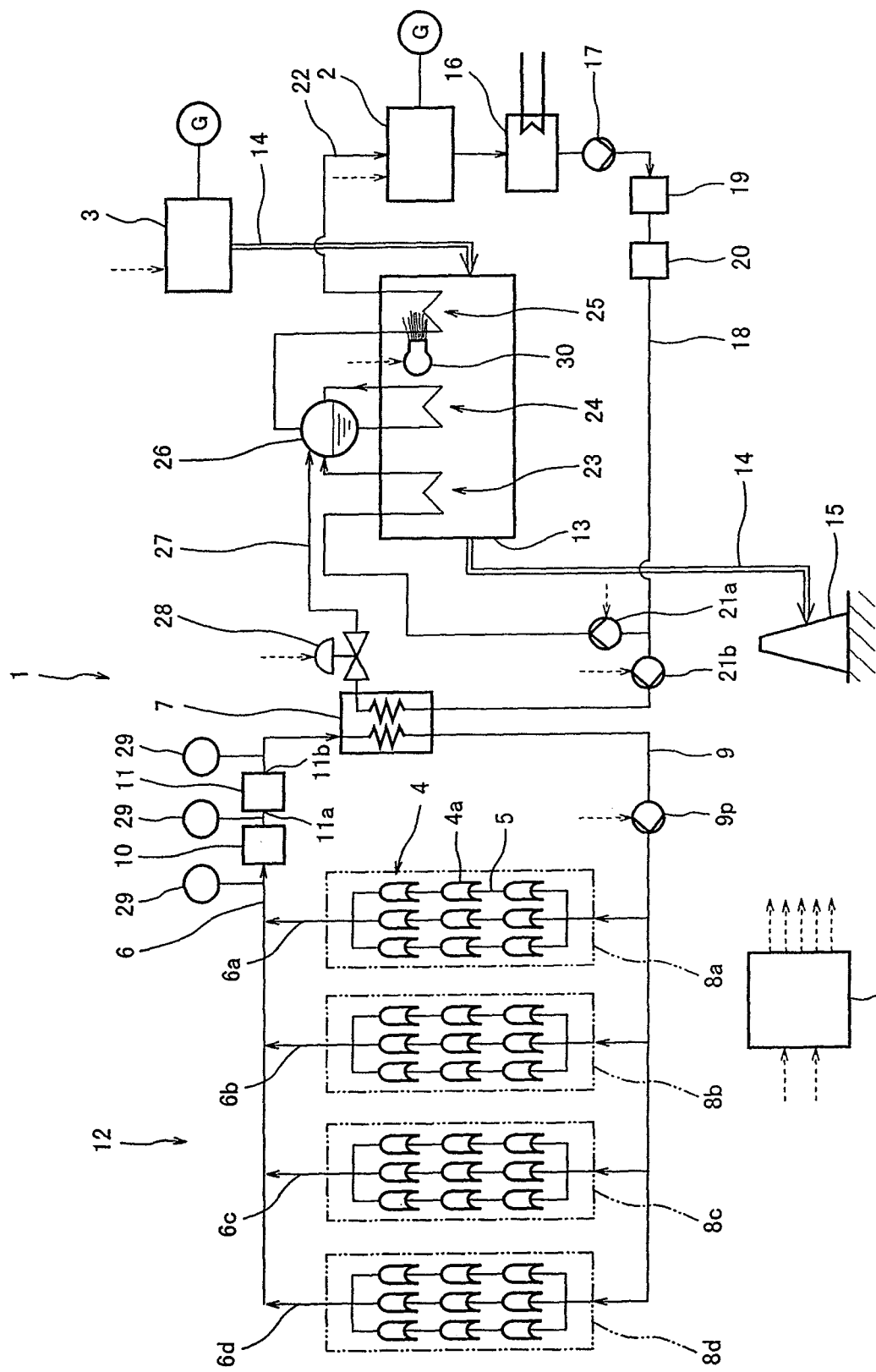
FIG. 1 is a piping diagram schematically illustrating an integrated solar combined cycle electric power generation system as one embodiment of the present invention.

FIG. 1 illustrates an integrated solar combined cycle electric power generation system 1 in which steam turbine electric power generation by a steam turbine 2 driven by utilizing part of steam generated relying upon solar heat and gas turbine electric power generation by a gas turbine 3 driven by combusting any one of various gas or liquid fuels, such as natural gas, are combined together. The electric power generation system 1 shown uses reflectors 4a of the parabolic trough type forming a heat collecting unit 4 for collecting solar heat to generate steam. Each of the reflectors 4a is trough-shaped having a parabolic section in an X-Y plane and is operated to reflect rays of sunlight incident thereon so as to collect them on its focal point.

Heat absorbing tubes 5, each of which extends through the focal points of associated reflectors 4a along the Z-axis, allow a liquid heating medium to flow therein. Heating medium supply piping 6 connected to the heat absorbing tubes 5 circulates the heating medium to a heat exchanging device 7 and to heat collecting units 4. The heat exchanging device 7 serves as an evaporator. The heating medium absorbs solar heat in the heat collecting units 4, heats water for generating steam in the heat exchanging device 7, and returns to the heat collecting units 4. The heat collecting units 4 and the heat absorbing tubes 5 form a heating system for the heating medium.

The electric power generation system 1 has plural heat collecting zones 8a, 8b, 8c and 8d in each of which a respective heat collecting unit 4 is installed. This is because even if the entire installation area of the heat collecting units (usually an area of about 1400 m×700 m for the total system capable of generating electric power of 30 MW for example) is not uniformly flattened, the solar heat collecting zone is divided for effective installation of the heat collecting units. Alternatively, the zone is divided so as not to make the loop length of heating medium supply piping too long thereby to avoid an excessive pressure loss through the piping. Further, the division of the zone makes it possible to avoid stoppage of the entire system when inspecting and repairing some portion of the heat absorbing tube 5 and the heat collecting unit 4 even when the piping 5 or the unit 4 does not operate normally.

Lines of heating medium supply pipings 6a, 6b, 6c and 6d extending from the respective heat collecting zones 8a, 8b, 8c and 8d are unified and then connected to the heat exchanging device 7. The heating medium supply piping 6 thus unified is provided with a heating medium heater 10 to be described later. The heat exchanging device 7 has an outlet joined to a return piping 9 connected to the heat collecting zones. The "heating medium supply piping 6", as referred to herein, includes the return piping 9 also. The heating medium supply piping 6 is provided with a circulating pump 9p for circulating the heating medium. Though the single pump 9p is shown in FIG. 1, a plurality of such pumps may be used for sharing a pressure loss in the piping as required if the heating medium supply piping 6 is too long and large. By controlling the flow rate of the heating medium circulated by these pumps, the input of heat to the heat exchanging device 7 can be adjusted, and thereby the amount of steam to be generated by the heat exchanging device 7 can be controlled. The heat collecting units 4, heating medium supply piping 6, heat exchanging device 7 and heating medium heater 10 form a heating medium supply system 12.

Electric power generation is conducted by the steam turbine 2 and the gas turbine 3, as described above. The two turbines 2 and 3 are coupled to respective electricity generators G. The electric power generation system 1 is provided with a waste heat recovery boiler 13. High temperature combusted gas exhausted from the gas turbine 3 is supplied to the waste heat recovery boiler 13 to heat the supplied water for generating steam and then emitted into the atmosphere from a stack 15 through the exhaust gas piping 14. The steam turbine 2 is driven both by the steam generated from the heat exchanging device 7 and the steam generated from the waste heat recovery boiler 13.

The steam having driven the steam turbine 2 is condensed into water by a condenser 16 and then fed through a water supply piping 18 with a pressure by means of a water supply pump 17. Specifically, first, the condensed water is heated by a supplied water heater 19 and then deaerated by a deaerator 20. Subsequently, water is passed through branched lines and supplied to the waste heat recovery boiler 13 and the heat exchanging device 7 by means of respective pumps 21a and 21b. The steam generated by the heat exchanging device 7 and the steam generated by the waste heat recovery boiler 13 are joined together and supplied to the steam turbine 2 through a unified steam supply piping 22. As described later, the unified steam supply piping 22 extends to pass through a superheater 25 of the waste heat recovery boiler 13. The flow rate ratio of water to be supplied to the waste heat recovery boiler 13 and to the heat exchanging device 7 is controlled, in accordance with electricity demand and actually collected solar thermal energy, based on a steam production program determined at a planning stage of the electric power generation system.

An exemplary basic construction of the aforementioned waste heat recovery boiler 13 comprises an economizer (i.e., preheater) 23, an evaporator 24 having a steam drum 26, and a superheater 25. The steam generated by the heat exchanging device 7 is in a saturated condition. Therefore, such saturated steam needs to be superheated by utilizing the superheater 25 of the waste heat recovery boiler 13 before being supplied to the steam turbine 2. To this purpose, a steam supply piping 27 is provided to interconnect the steam outlet of the heat exchanging device 7 and the steam drum 26 provided upstream of the superheater 25. The saturated steam supplied from the heat exchanging device 7 to the steam drum 26 through the steam supply piping 27 is mixed with steam generated by the evaporator 24 of the waste heat recovery boiler 13 within the steam drum 26. The steam thus mixed is fed to the superheater 25 and superheated. The superheater 25 is designed and manufactured to have the capability (i.e., heating area) of heating the total amount of the saturated steam from the heat exchanging device 7 and the saturated steam from the evaporator 24 to a predetermined superheat temperature, so that the waste heat recovery boiler 13 can supply the steam turbine 2 with the superheated steam having stabilized properties.

The aforementioned steam supply piping 27 is preferably provided with a flow control valve 28. The flow control valve 28 is controlled so as to prevent the steam supply rate to the waste heat recovery boiler 13 from changing rapidly and largely because of a rapid decrease in collected solar heat due to shading of sunlight by clouds during daytime, a steep drop in the solar heat collecting efficiency due to bending of reflectors in the heat collecting units 4 caused by wind pressure, or a rapid decrease in the solar heat after sunset. Also, the flow control valve 28 is controlled so that the amount of generated steam that begins increasing with the rising sun may be kept within an allowable range of the waste heat recovery boiler 13. Further, the flow control valve 28 is controlled to close the steam supply piping 27 particularly after sunset because the steam in the steam supply piping 27 naturally runs out.

In the integrated solar combined cycle electric power generation system, the temperature of the heating medium to be supplied from the heat collecting zone 8 fluctuates with time as weather conditions, including sunshine conditions, change. For this reason, the heating medium supply piping 6 of the integrated solar combined cycle electric power generation system 1 is provided with the aforementioned heating medium heater 10 for heating the heating medium so that the temperature of the heating medium reaching the heat exchanging device 7 is sufficiently recovered even if the temperature of the heating medium falls in the heat collecting units 4. The heating medium supply piping 6 is preferably provided with a heating medium mixer 11 as shown in FIG. 1 for further suppressing the temperature fluctuations of the heating medium. The heating medium mixer 11 is described later.

Figure 2:
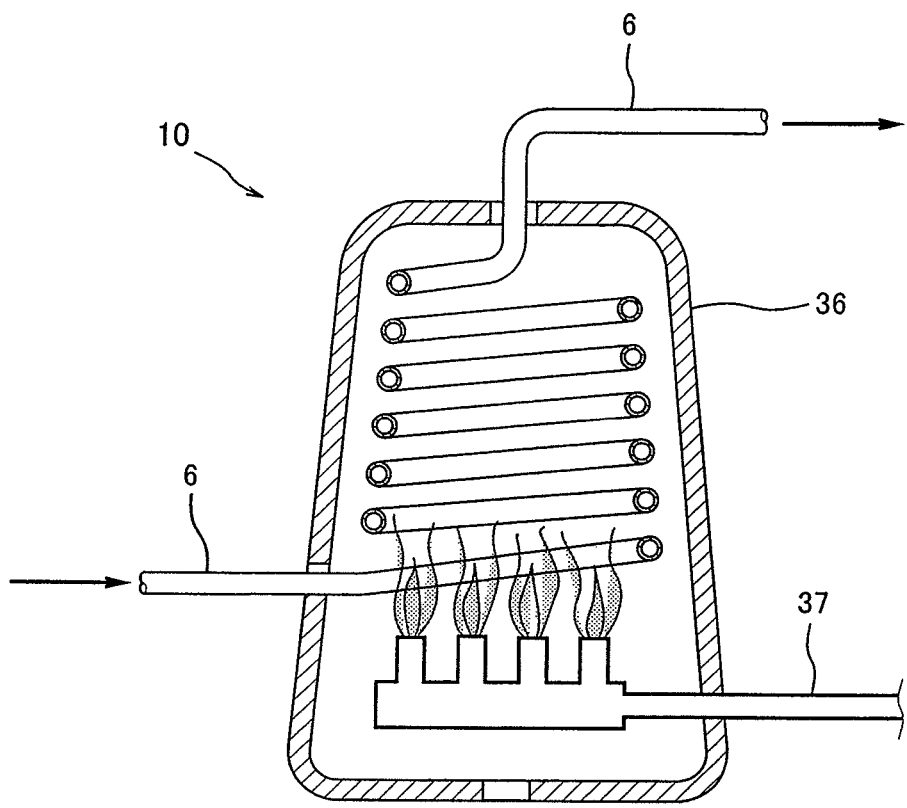
FIG. 2 is a sectional view showing one example of a heating medium heater which can be provided in the integrated solar combined cycle electric power generation system shown in FIG. 1.

FIG. 2 shows the aforementioned heating medium heater 10 in detail. The heating medium heater 10 comprises a heating medium supply piping 6 bent into a helical structure and a hood 36 covering this helical structure. A heating means 37, such as a burner, is provided below the helical structure for heating the helical structure. The top of the hood defines an opening 36a for emitting combustion gas from the burner or the like and for the heating medium supply piping 6 to extend therethrough. In shaping the heating medium supply piping 6 into the helical structure, the helical structure may have, for example, two or more helices laid upon another without limitation to the structure shown. Instead of bending the heating medium supply piping 6 into the helical structure, the heating medium supply piping 6 may be formed into a simple zigzag shape (successively and repeatedly folded shape) or a like shape. Further, the heating medium supply piping 6 thus shaped may be formed with heat transfer fins.

Figure 3:
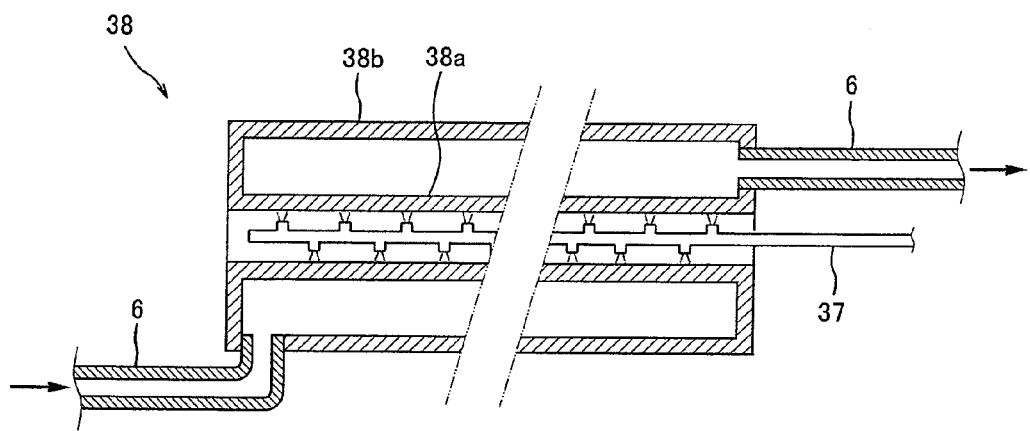
FIG. 3 is a sectional view showing another example of a heating medium heater which can be provided in the integrated solar combined cycle electric power generation system shown in FIG. 1.

The heating medium heater 10 may employ various other structures. For example, a heating medium heater 38 shown in FIG. 3 has a structure wherein a part of the heating medium supply piping 6 has a double-pipe structure comprising an inner pipe 38a provided therein with the heating means 37, such as a burner, and an outer pipe 38b which, together with the inner pipe 38a, defines a passage therebetween for the heating medium to pass therethrough.

Figure 4:
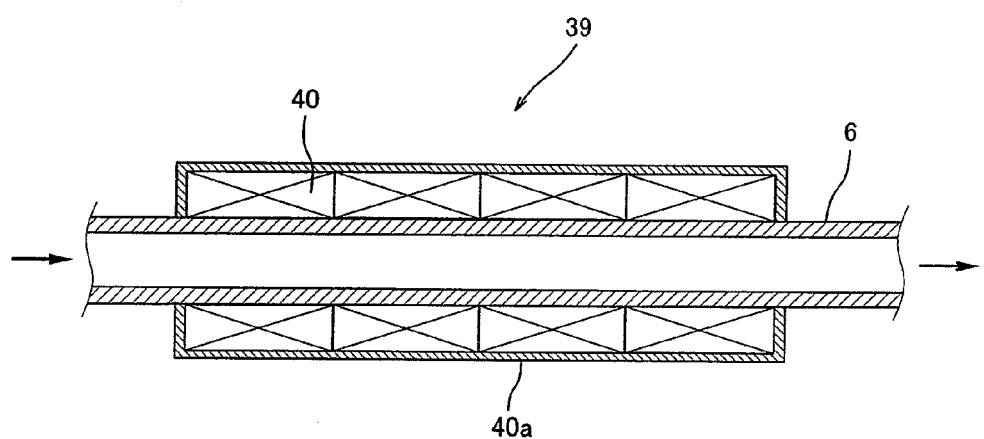
FIG. 4 is a sectional view showing yet another example of a heating medium heater which can be provided in the integrated solar combined cycle electric power generation system shown in FIG. 1.

A heating medium heater 39 shown in FIG. 4 has heating means 40, such as an electric heater, wrapping the outer periphery of the heating medium supply piping 6, and a heat insulating member 40a covering the outer peripheral surface of the heating means 40. Any other suitable heating means is applicable without limitation to this arrangement. For example, high-temperature steam may be employed as a heat source for heating instead of the electric heater. Specifically, such an arrangement is possible wherein the outer periphery of the heating medium supply piping 6 is wrapped with a piping which allows high-temperature steam generated by the waste heat recovery boiler 13 to be fed therethrough.

The heating medium supply piping 6 is provided with temperature measuring devices 29 which are provided on the upstream side and the downstream side of the heating medium heater 10 for successive measurements of the temperature of the heating medium. The heating medium heater 10 is actuated when an abnormal temperature fall of the heating medium is detected by the upstream side temperature measuring device 29. The heating medium heater 10 is feedback-controlled according to the result of measurement by the downstream side temperature measuring device 29. For example, the heating medium heater 10 is feedback-controlled so as to keep the temperature of the heating medium flowing at the inlet of the heat exchanging device 7 at a value of about 395° C. maximum. The heating medium heater 10 may be controlled by a separately-provided control device 70 (FIG. 1) so that the temperature of the heating medium does not fall below a predetermined allowable minimum temperature. It is possible to actuate the heating medium heater 10 when a substantial fall in the temperature of the heating medium (e.g., about 40° C. or more) is forecast based on observation of shading by clouds by, for example, a weather satellite probing weather conditions of a region around the solar heat collecting zone.

The heating medium heater 10, which exhibits the effect of suppressing the temperature fluctuation of the heating medium in daytime, makes it possible to start up the heating medium supply system 12 quickly after sunrise by heating the heating medium of which temperature is lowered after sunset while circulating the heating medium.

Preferably, the heating medium supply piping 6 is provided with the aforementioned heating medium mixer 11 configured to suppress the temperature fluctuation of the heating medium, as shown in FIG. 1. The heating medium mixer 11 is formed with a heating medium inlet 11a connected to the upstream side of the heating medium supply piping 6 and a heating medium outlet 11b formed separately from the inlet 11a and connected to the downstream side of the heating medium supply piping 6. Also, the heating medium mixer 11 is formed therein with plural heating medium passages. The details of the heating medium mixer 11 are described in the international patent application (PCT/JP2006/312162) filed by the applicant of the instant application. While the present embodiment has the heating medium mixer 11 provided downstream of the heating medium heater 10, the heating medium mixer 11 may be provided upstream of the heating medium heater 10.

The heating medium flowing into the heating medium mixer 11 with its temperature fluctuating moment by moment is time-lag mixed within the heating medium mixer 11. Specifically, portions of the heating medium that start flowing into the heating medium mixer 11 at a certain point of time are passed through the different heating medium passages to form different streams within the heating medium mixer 11, thus providing such a distribution of streams as to allow some portions to flow out through the outlet 11b for a relatively short time and simultaneously cause other portions to reside in the passages of the heating medium mixer 11 for a relatively long time. Since fresh portions of the heating medium newly flow into the heating medium mixer 11 through the inlet 11a continuously, the portions of the heating medium that flowed into the mixer 11 in the past and the portions that have newly flowed thereinto are mixed together incessantly. Accordingly, non-uniformity in the temperature of the heating medium that occurs with time, namely, the temperature fluctuation of the heating medium, can be uniformalized. This function is herein referred to as "time-lag mixing". By subjecting the heating medium to time-lag mixing, the temperature fluctuation range of the heating medium is reduced and the temperature fluctuation speed is lowered. The heating medium mixer 11 performs the time-lag mixing functions as a temperature fluctuation suppressing device for the heating medium.

The heating medium supply piping 6 is preferably provided with temperature measuring devices 29 on respective of the upstream side and the downstream side of the heating medium mixer 11 for successive measurements of the temperature of the heating medium. These temperature measuring devices 29 make it possible to detect temperature fluctuations of the heating medium in the heating medium supply piping 6 on the upstream and downstream sides of the heating medium mixer 11. Signals indicative of temperature fluctuations of the heating medium on respective of the upstream and downstream sides of the heating medium mixer 11 are sent to the control device 70. By comparison between these signals, it is possible to monitor the degree of a temperature fluctuation suppressing effect performed by the heating medium mixer 11.

Such heating medium heater 10 and heating medium mixer 11, as described above, may be provided on each of the lines of heating medium supply pipings 6a, 6b, 6c and 6d associated with the respective heat collecting zones 8a, 8b, 8c and 8d, unlike FIG. 1, the heating medium heater 10 and the heating medium mixer 11 being independent of each other. As illustrated below, it is possible to employ a unified structure comprising the heating medium heater 10 and the heating medium mixer 11.

Figure 5A:
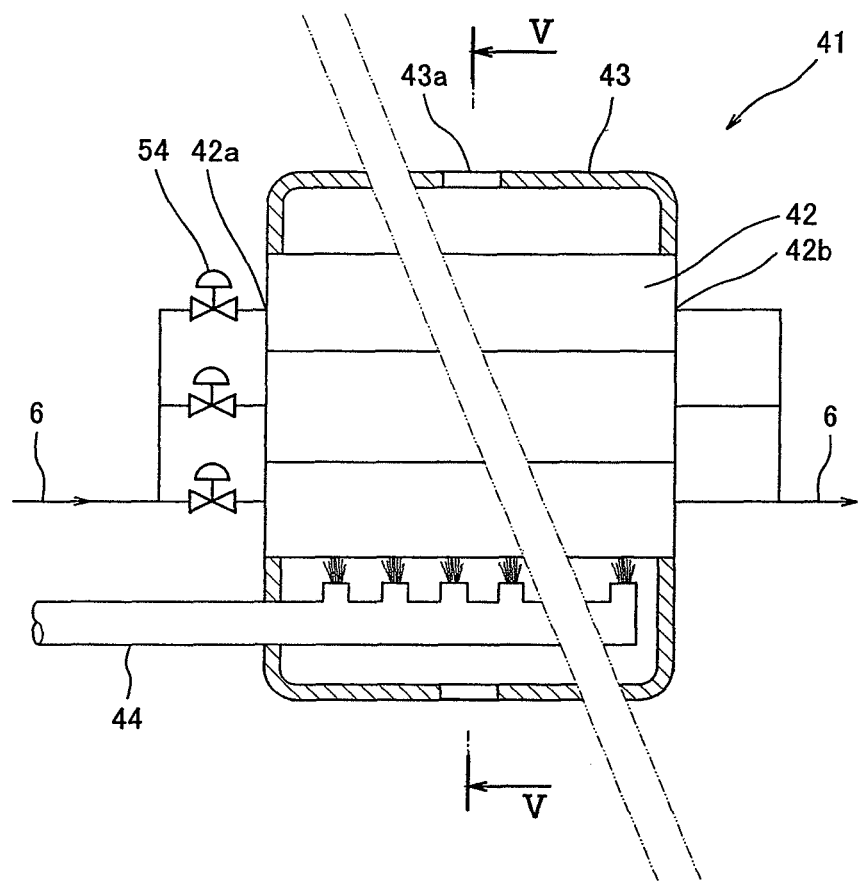
FIG. 5A is a partially cutaway front elevational view showing yet another example of a heating medium heater which can be provided in the integrated solar combined cycle electric power generation system shown in FIG. 1.
Figure 5B:
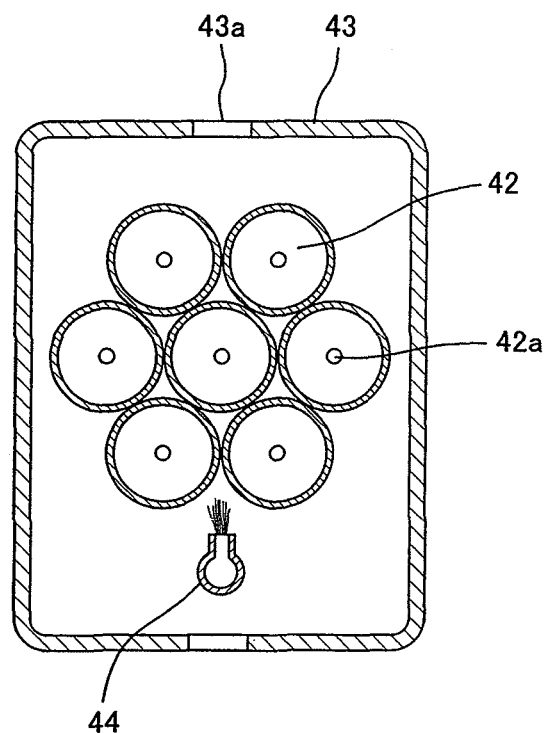
FIG. 5B is a sectional view taken on line V-V of FIG. 5A.

A heating medium heater 41 shown in FIGS. 5A and 5B is given the function of heating the heating medium as well as the function of mixing the heating medium. FIG. 5A is a front elevational view of the heating medium heater 41 with its hood 43, to be described below, partially cutaway; and FIG. 5B is a sectional view taken on line V-V of FIG. 5A. The heating medium mixing function of the heating medium heater 41 is performed relying upon plural heating medium passages, like the above-described heating medium mixer 11.

The heating medium passages of the heating medium heater 41 are each formed of a respective one of independent containers 42. The containers 42 have substantially equal volume. Each of the containers 42 has an inlet hole 42a and an outlet hole 42b. The inlet holes 42a are each connected to a respective one of branch pipings branched off from the upstream side portion of the heating medium supply piping 6. The branch pipings are provided with respective flow control valves 54. The openings of the respective flow control valves 54 are controlled to allow the heating medium to flow into the respective containers 42 at different flow rates. The outlet holes 42b are each connected to a respective one of branch pipings branched off from the downstream side portion of the heating medium supply piping 6. Streams of the heating medium that have flowed out of the respective containers 42 at time-lags begin being mixed together in a unified portion of the heating medium supply piping 6 on the downstream side. That is, the heating medium is time-lag mixed, whereby the temperature fluctuation range of the heating medium is reduced and the temperature fluctuation speed is lowered.

The heating medium heater 41 has the hood 43 covering the plural containers 42. A heating means 44, such as a burner, is provided below the assembly of the containers 42 within the hood 43 for heating the containers 42. The top of the hood 43 defines an opening 43a for emitting combustion gas from the burner or the like. The heating medium flowing in the containers 42 is heated by the heating means 44.

It is possible that the containers have different kinds of volume and the heating medium is forced to flow into the containers at substantially equal flow rates. In this case, the provision of the flow control valves on the inlet side is not particularly required. Such a heating medium fluctuation suppressing device can effectively time-lag mix the heating medium having flowed thereinto, thereby suppressing the temperature fluctuation of the heating medium.

The integrated solar combined cycle electric power generation system 1 has a steam supply line to the steam turbine 2 which is also provided with a device for suppressing a fluctuation of the steam condition resulting from the temperature fluctuation of the heating medium. Specifically, the superheater 25 of the waste heat recovery boiler 13 is provided with an auxiliary burner 30 for realizing a stabilized superheated condition of steam flowing on the inlet side of the steam turbine 2 even when the steam condition fluctuates. Such steam condition fluctuation can be suppressed, without the provision of the auxiliary burner 30, by the aforementioned heating medium heater 10 preventing the temperature of the heating medium from falling. The provision of the auxiliary burner 30 is preferable because the burner 30 can further enhance the effect of suppressing the steam condition fluctuation thereby turning the steam condition into a stabilized superheated condition.

The condition of steam to be fed to the superheater 25 fluctuates as a result of a fluctuation in the condition of saturated steam to be supplied from the heat exchanging device 7 to the steam drum 26. By additionally heating steam having a rise in wetness as a part of such a fluctuation by means of the auxiliary burner 30, the ability of the superheater 25 can be enhanced. Since the solar energy is maximized in daytime, the gas turbine 3 is often operated economically by a partial-load operation with reducing the load on the gas turbine 3. In such a case, even when a significant fall occurs in the temperature of the heating medium abruptly, it is possible to actuate the auxiliary burner 30 to lessen the resulting fluctuation in the condition of superheated steam, thereby keeping the steam condition constant.

Figure 6:
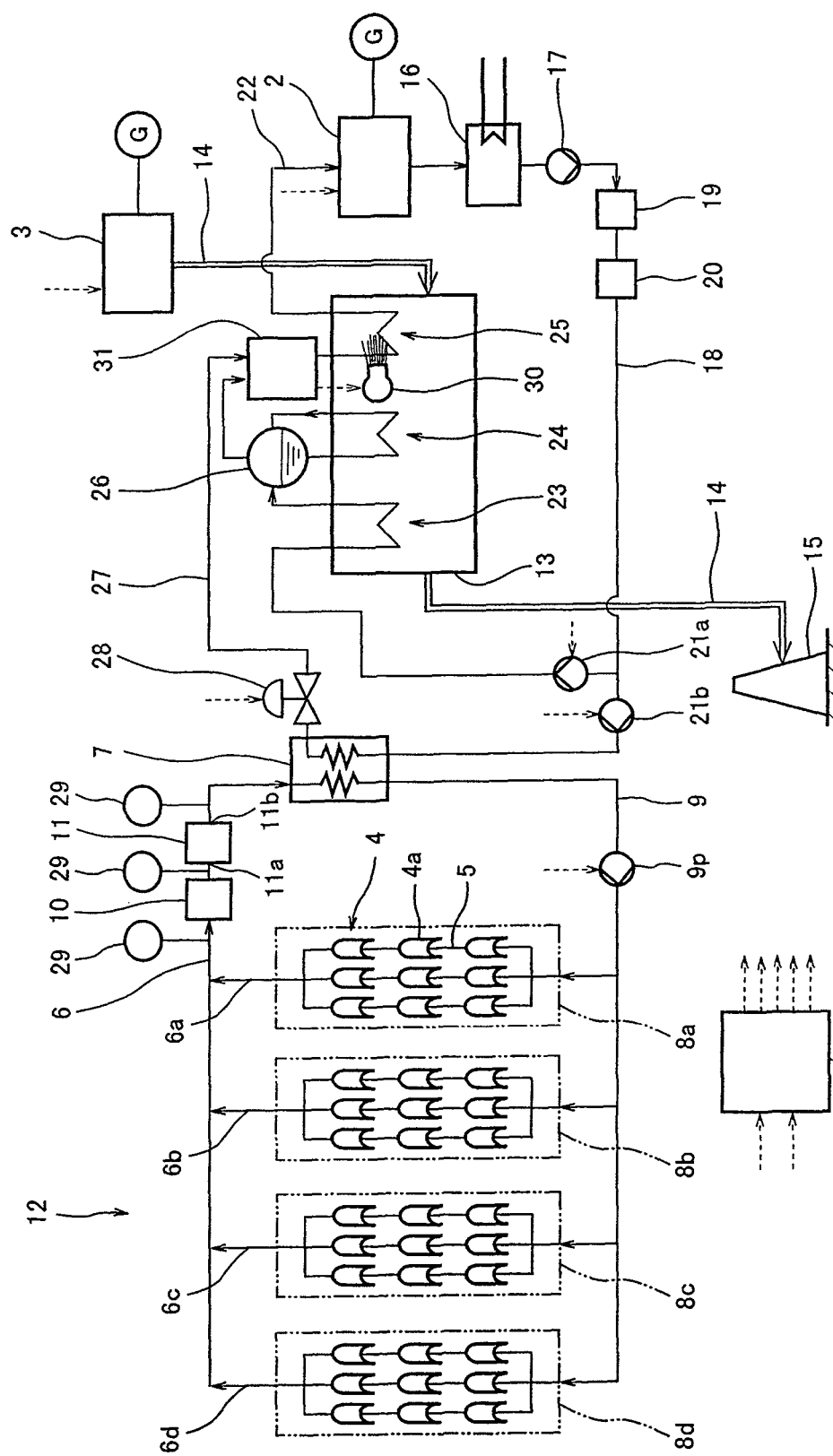
FIG. 6 is a piping diagram schematically illustrating another embodiment of an integrated solar combined cycle electric power generation system according to the present invention.

The steam supply piping 27 for supplying saturated steam generated by the heat exchanging device 7 may be connected to an additional steam mixer 31 instead of the steam drum 26, as shown in FIG. 6. Such an arrangement allows saturated steam generated by the heat exchanging device 7 to be mixed with saturated steam generated by the evaporator 24 of the waste heat recovery boiler 13 by means of the steam mixer 31. The steam mixer 31 may comprise either a tank having a relatively large volume or a tank having an internal volume which is variable in accordance with the internal pressure of the tank. The tank of the steam mixer 31 has a large volume as compared to the aforementioned steam drum 26.

The steam mixer 31 is effective in cases where the amount of steam to be generated by the waste heat recovery boiler 13 is planned to be equal to or slightly larger than the amount of steam being fed from the heat exchanging device 7 or in cases where a sufficient amount of exhaust gas is available from the gas turbine 3 operating in a rated condition constantly. The electric power generation system shown in FIG. 6 is the same as the electric power generation system 1 shown in FIG. 1 except the feature that the steam mixer 31 is added and saturated steam from the heat exchanging device 7 is fed to the steam mixer 31 instead of the steam drum 26. For this reason, the same reference characters are used to designate similar elements, except the steam mixer 31, throughout FIGS. 1 and 6 in order to omit the description thereof.

The steam mixer 31 is preferably provided with a perforated plate having multiple perforations which is positioned to obstruct the steam flow path in order to enhance the steam mixing effect. With such a feature, steam generated by the waste heat recovery boiler 13 and steam fed from the heat exchanging device 7 are joined and mixed together on the upstream side of the perforated plate serving as a resistance to the flow of fluid and then further mixed after having passed through the perforations, which enhances the steam mixing effect. Thus, uniform mixing of steam can be made easier.

The steam mixer 31 may have a configuration wherein plural perforated plates which are laid on one another so as to be displaceable relative to each other are positioned in the steam mixer 31 to obstruct the steam flow path. Each of the perforated plates has plural perforations and by displacing the plural perforated plates relative to each other in the plane of contact therebetween as laid on one another, the degree of overlap between the perforations of one perforated plate and those of another perforated plate varies and, hence, the percentage of open area of all the perforations is adjusted.

Figure 7:
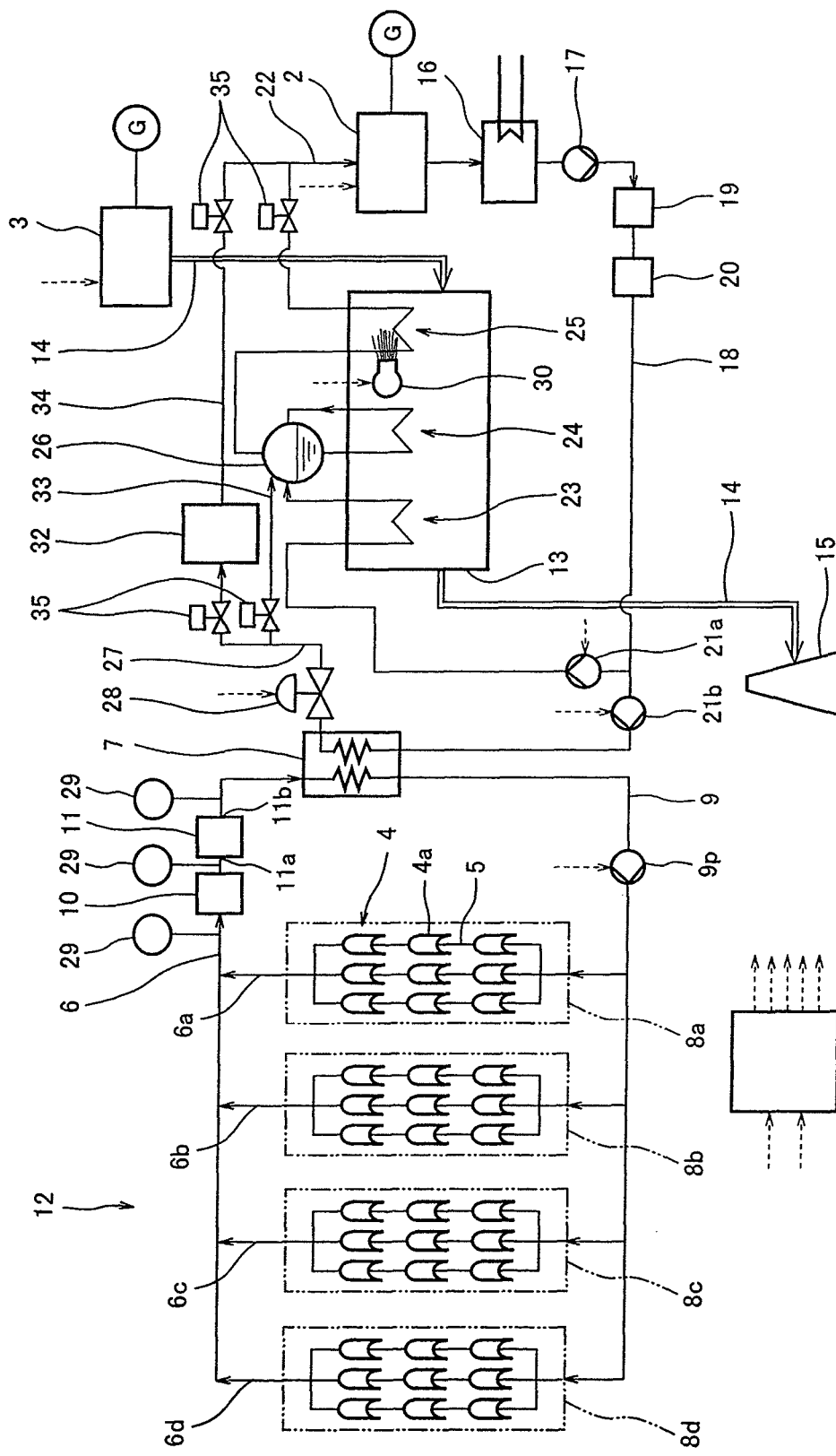
FIG. 7 is a piping diagram schematically illustrating yet another embodiment of an integrated solar combined cycle electric power generation system according to the present invention.

FIG. 7 illustrates an electric power generation system wherein saturated steam generated by the heat exchanging device 7 is superheated by means of a superheating device 32 which is provided independently of the waste heat recovery boiler 13. The superheating device 32 functions to heat saturated steam by combusting any one of various gas or liquid fuels, such as natural gas for example. In this electric power generation system, the steam supply piping 27 connected to the outlet of the heat exchanging device 7 is branched into branch pipings at a location downstream of the flow control valve 28. One branch piping (hereinafter referred to as "first steam supply piping") 33 is connected to the steam drum 26 of the waste heat recovery boiler 13 as in FIG. 1. The other branch piping (hereinafter referred to as "second steam supply piping") 34 is joined to the unified steam supply piping 22 configured to supply the steam turbine with superheated steam from the waste heat recovery boiler 13 and then connected to the steam turbine 2. The second steam supply piping 34 is provided with the aforementioned superheating device 32.

The solar thermal electric power generation system is the same as the electric power generation system 1 shown in FIG. 1 except the feature that the second steam supply piping 34 and the superheating device 32 are provided. For this reason, the same reference characters are used to designate similar elements, except the second steam supply piping 34 and the superheating device 32, throughout FIGS. 1 and 7 in order to omit the description thereof.

The first steam supply piping 33 is provided with a stop valve 35 at a location upstream of the steam drum 26 and the unified steam supply piping 22 provided with a stop valve 35 at a location upstream of the joint with the second steam supply piping 34. Also, the second steam supply piping 34 is provided with stop valves 35 at respective locations upstream and downstream of the superheating device 32. By operating these stop valves 35, it is possible to supply saturated steam generated by the heat exchanging device 7 to either or both of the waste heat recovery boiler and the superheating device 32 selectively. That is, saturated steam generated by the heat exchanging device 7 can be superheated by means of either or both of the waste heat recovery boiler 13 and the superheating device 32.

Accordingly, even when the gas turbine 3 or the waste heat recovery boiler 13 stops, the steam turbine 2 can be supplied with superheated steam by using the superheating device 32 to continue electric power generation as long as solar heat can be collected.

Figure 8:
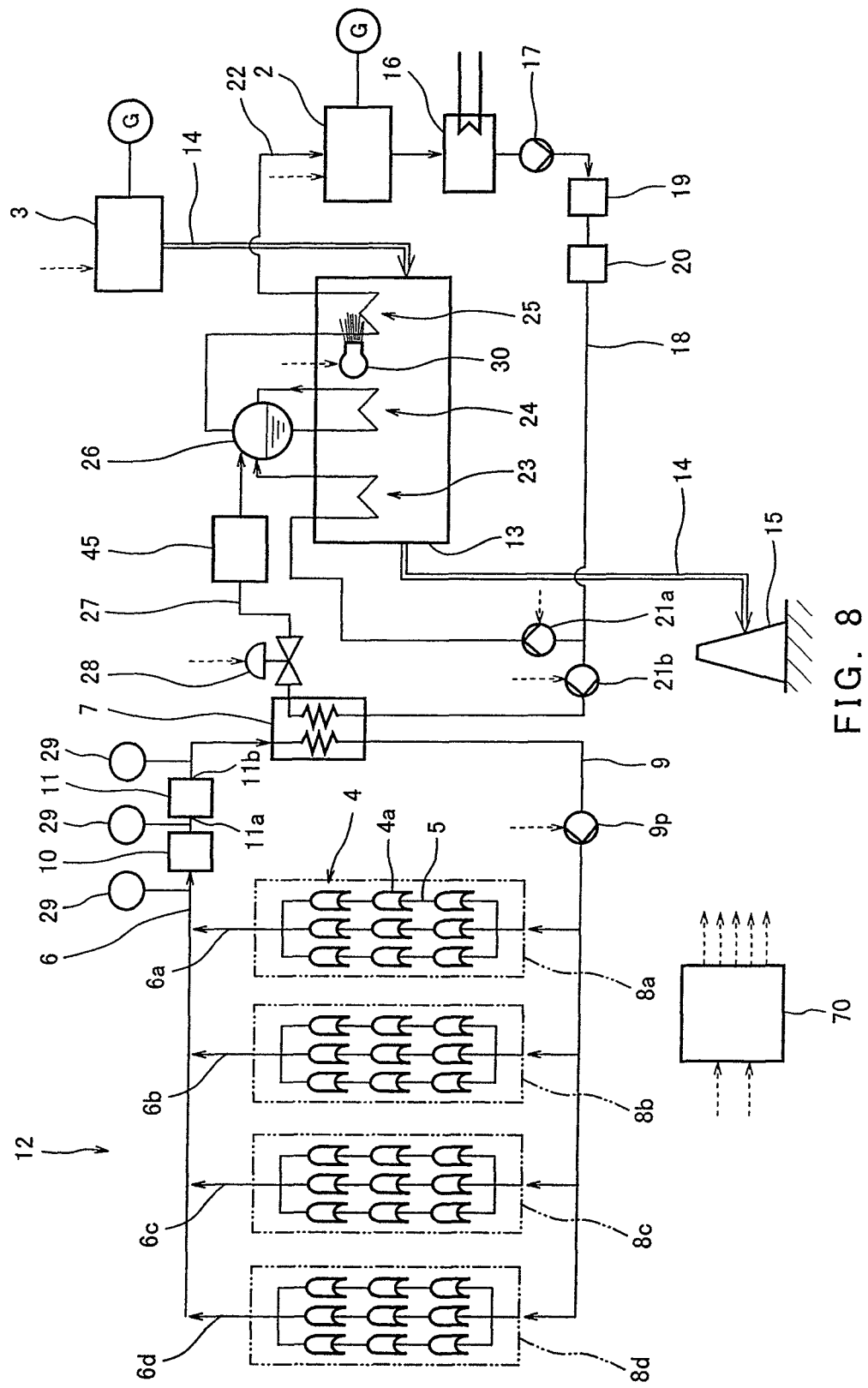
FIG. 8 is a piping diagram schematically illustrating yet another embodiment of an integrated solar combined cycle electric power generation system according to the present invention.

An electric power generation system shown in FIG. 8 is a system constructed by providing the electric power generation system 1 shown in FIG. 1 with a steam fluctuation suppressing device 45 configured to mix saturated steam from the heat exchanging device 7 for suppressing a fluctuation of its steam condition. This electric power generation system is the same as the electric power generation system 1 shown in FIG. 1 except the feature that the steam supply piping 27 is provided with the steam fluctuation suppressing device 45. For this reason, the same reference characters are used to designate similar elements, except the steam fluctuation suppressing device 45, throughout FIGS. 1 and 8 in order to omit the description thereof.

The steam fluctuation suppressing device 45, as well as the auxiliary burner 30, forms a contrivance to suppress a steam condition fluctuation resulting from a temperature fluctuation of the heating medium. In contrast to the auxiliary burner 30, which serves to maintain a stabilized superheated degree of supplied steam in accordance with a rise in the wetness of saturated steam, the steam fluctuation suppressing device 45 serves to obtain saturated steam having a substantially stabilized wetness by the aforementioned time-lag mixing of saturated steam that is fed thereto while fluctuating in wetness. The function of heating saturated steam to a superheated condition relies upon the superheater 25, auxiliary burner 30 or the superheating device 32 (FIG. 14), which are provided downstream of the steam fluctuation suppressing device 45.

The saturated steam supplied to the steam drum 26 after having passed through the steam fluctuation suppressing device 45 has a wetness fluctuation suppressed and stabilized therefore. In the steam drum 26, such saturated steam having a stabilized wetness is mixed with saturated steam having a stabilized wetness that is generated by the waste heat recovery boiler 13. Accordingly, the aforementioned devices 25, 30 and 32 provided downstream of the steam drum for superheating steam can perform their respective operations stably. Therefore, even if the steam fluctuation suppressing device 45 is used instead of the aforementioned heating medium heater 10 or heating medium mixer 11 of the heating medium supply system 12, the steam fluctuation suppressing device 45 can exhibit the steam fluctuation suppressing effect. Of course, the steam fluctuation suppressing device 45 may be used along with the heating medium heater 10 and the heating medium mixer 11.

FIGS. 9A to 12B show steam fluctuation suppressing devices 45, 46, 47 and 48 of different types. Any one of these steam fluctuation suppressing devices is formed with a steam inlet (e.g., an inlet hole 52) connected to an upstream side of the steam supply piping 27 and a steam outlet (e.g., an outlet hole 53) which is separate from the inlet and is connected to a downstream side of the steam supply piping 27. Each of the steam fluctuation suppressing devices has various contrivances in order to time-lag mix saturated steam sufficiently within the device. That is, each steam fluctuation suppressing device is configured to cause a portion of introduced saturated steam to reside within the device for a relatively long time and to be sufficiently mixed with following saturated steam that flows into the device, thereby achieving effective time-lag mixing. Generally speaking, the steam fluctuation suppressing device is configured to allow introduced saturated steam to pass through plural steam passages formed therein in different times to form respective streams and join together each of the streams of steam having passed through the respective passages, thereby achieving the time-lag mixing.

Figure 9A:
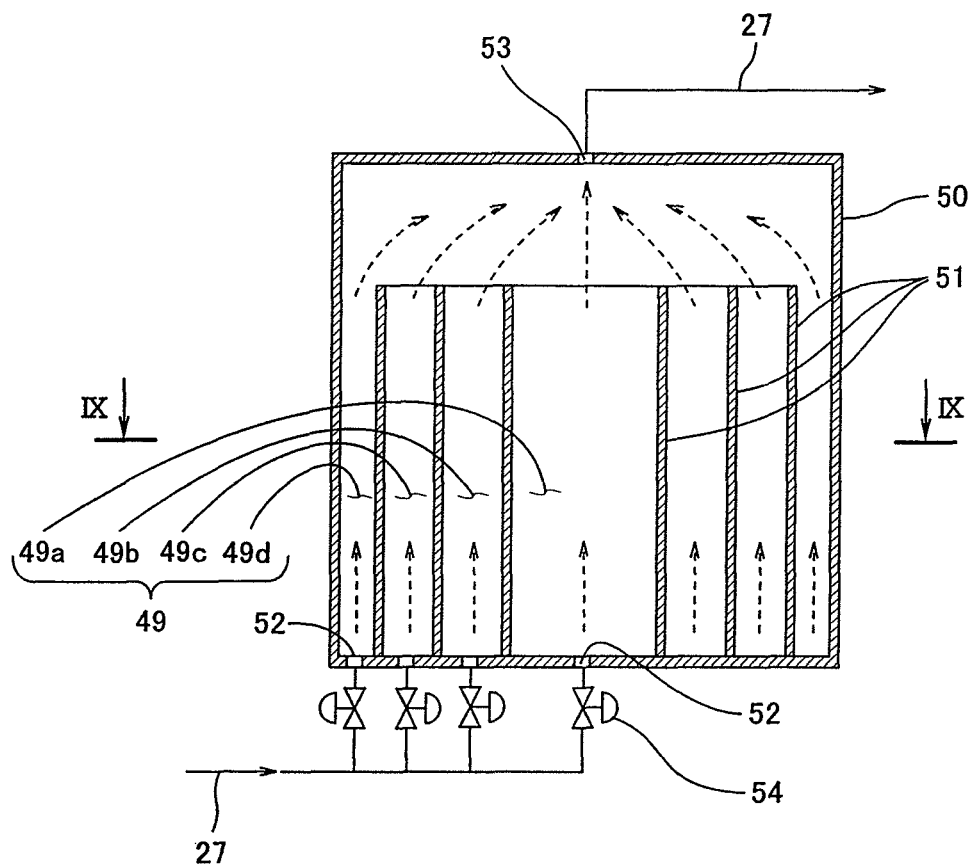
FIG. 9A is a vertical sectional view showing one example of a steam fluctuation suppressing device which can be provided in the integrated solar combined cycle electric power generation system shown in FIG. 8, the vertical sectional view being cut by a plane along the central axis of the device.
Figure 9B:
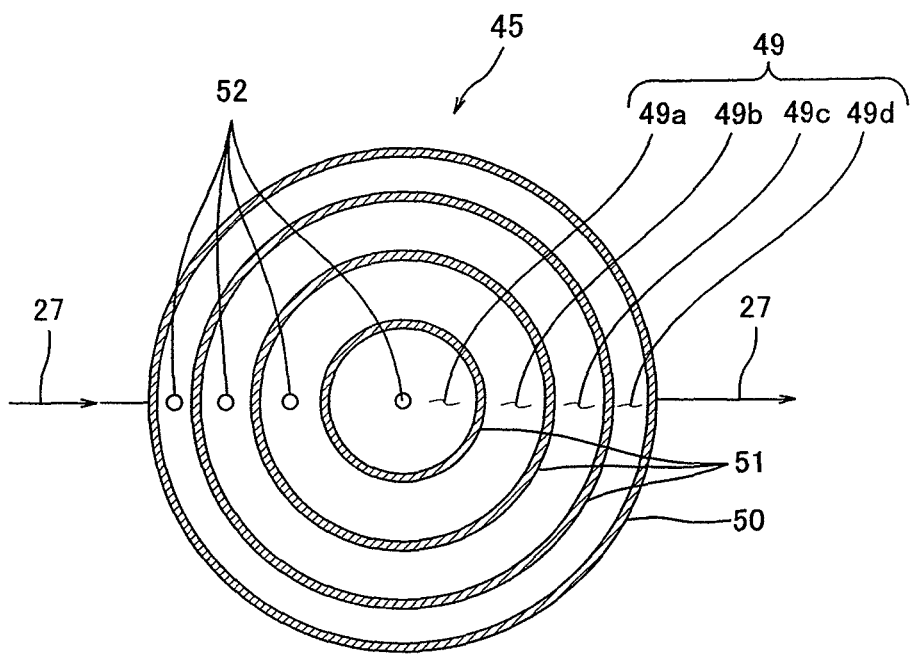
FIG. 9B is a sectional view taken on line IX-IX of FIG. 9A.

The steam fluctuation suppressing device 45 shown in FIGS. 9A and 9B employs a tank 50 having therein plural cells 49 forming plural steam passages as a steam passage forming member which form different steam passages. In this embodiment, plural cylindrical partition walls 51 having free upper edges are arranged concentrically as spaced from each other on the bottom of the cylindrical tank 50. The space between the peripheral wall of the tank and the cylindrical partition wall 51 adjacent thereto and the spaces between adjacent partition walls 51 form respective of the steam passages 49. The height of the upper edge of each cylindrical partition wall 51 is lower than that of the ceiling of the tank 50. The cells (steam passages) 49 communicate with each other through the space defined between the ceiling of the tank 50 and the upper edges of the cylindrical partition walls 51. The bottom of the tank 50 defines steam inlet holes 52 at locations corresponding to the respective cells 49, while the ceiling of the tank 50 defines a single steam outlet hole 53 connected to a downstream side portion of the steam supply piping 27. Streams of steam having separately passed through the respective steam passages 49 are joined and mixed together at the outlet hole 53. While the steam passage forming member shown in FIG. 9A has four steam passages $49a$, $49b$, $49c$ and $49d$, there is no limitation to the number of steam passages as long as the number is not less than two. A larger number of steam passages is more preferable from the viewpoint of effective time-lag mixing of steam.

The inlet holes 52 are each connected to a respective one of branch pipings branched off from the upstream side portion of the steam supply piping 27, which are each provided with a respective one of flow control valves 54 for controlling the flow rate of steam flowing through a respective one of the branch pipings. In the present embodiment, all the cells 49 have substantially equal volume. Under this condition, the openings of the flow control valves 54 are controlled to cause steam to flow into the different cells 49 at different flow rates. As a result, different lengths of time are required for portions of steam that start flowing into the respective cells $49a$, $49b$, $49c$ and $49d$ at a certain point of time to reach the outlet hole 53. This results in time-lag mixing of streams of steam joined together after flowing out of the respective cells, so that the wetness fluctuation of steam is suppressed. This effect is described more specifically below.

With the flow control valves adjusted so that the flow rate ratio between portions of steam flowing respectively into the first and up to the nth steam passages having equal volume W is 1:2:3: ... n. The first portion of steam flowing into the first steam passage at a flow rate $V/\{n(n+1)/2\}$ at a certain point of time flows out of the first steam passage after a lapse of time $t1\_W \cdot n \cdot (n+1)/2V$, wherein V represents the flow rate of the whole of steam passing through the inlet holes 52. The second portion of steam flowing into the second steam passage at a flow rate $2V/\{n \cdot (n+1)/2\}$, at the same time when the first portion flows into the first steam passage, flows out of the second steam passage after a lapse of time $t2=W \cdot n \cdot (n+1)/4V=\frac{1}{2} \times t1$. The nth portion of steam flowing into the nth steam passage at a flow rate $n \cdot V/\{n \cdot (n+1)/2\}$, at the same time when the first portion flows into the first steam passage, flows out of the nth steam passage after a lapse of time to $=1/n \times t1$.

Each portion of steam having substantially equal wetness which has flowed into each respective steam passage at the same time, flows out of each respective steam passage after a lapse of different time periods and each portion is then joined together and mixed at the outlet hole 53. As a result, steam having flowed into the steam fluctuation suppressing device 10 is effectively time-lag mixed, so that the wetness fluctuation of steam is suppressed. The outlet hole 53 may be provided with a mixing device or a stirring device for further mixing the streams of steam having flowed out of the respective steam passages with time-lags after joining. Such a device may include a rotor, such as a screw propeller, and a forced jetting device. An electric motor or the like for driving such a rotor is preferably located outside the tank or the steam passages. Instead of the rotor or the like, such a static member or construction may be fixed so as to change the forms of steam streams. For example, stationary blades may be attached to the inner wall surface of the flow path.

While the flow rate ratio between the portions of steam flowing into the respective steam passages is a ratio of integers in the above-described embodiment, any desired flow rate ratio can be selected without limitation to such a ratio of integer. Also, portions of steam may be passed through some of the steam passages at equal flow rate when necessary.

While the plural steam passages of the steam fluctuation suppressing device 45 shown in FIG. 9A have equal volume and portions of steam are forced to flow into the respective steam passages at different flow rates, it is possible that the plural steam passages have different kinds of volume and portions of steam are forced to flow into the respective steam passages at equal flow rate, as described hereafter.

Though not shown, such a steam fluctuation suppressing device has a tank in which plural cylindrical partition walls are arranged concentrically as spaced from each other, like the steam fluctuation suppressing device 45 shown in FIG. 9. The space between the peripheral wall of the tank and the cylindrical partition wall adjacent thereto and the spaces between adjacent partition walls form respective steam passages. Unlike the steam fluctuation suppressing device 45 shown in FIG. 9A, the cylindrical partition walls are spaced from each other to form steam passages (i.e., cells) having a volume ratio of 1:2:3:4 in the order from the innermost passage side, for example. Branch pipings branched off from the upstream side portion of the steam supply piping 27 are connected to respective inlet holes of the tank, but each of the branch pipings is not provided with a flow control valve 54. Thus, the steam fluctuation suppressing device is configured to allow steam to flow into all the steam passages (i.e., cells) at substantially equal flow rate to form respective streams and cause the resulting streams to be joined together before flowing out from the outlet hole into the downstream side portion of the steam supply piping 27. Such a steam fluctuation suppressing device can also time-lag mix steam before it flows out of the device, hence, suppress the wetness fluctuation of steam. This effect is described more specifically below.

For example, the flow rate of the whole of steam flowing into the steam fluctuation suppressing device through the steam supply piping 27 is V and the volume ratio between the first and up to the nth steam passages is 1:2:3: . . . n. The first portion of steam that flows into the first steam passage having a volume W at a flow rate $v=V/n$ at a certain point of time flows out of the first steam passage after lapse of time $t1=1$ $W/v$. The second portion of steam that flows into the second steam passage having a volume 2 W at equal flow rate $v=V/n$, at the same time when the first portion flows into the first steam passage, flows out of the second steam passage after lapse of time $t2=2$ $W/v=2t1$. The nth portion of steam that flows into the nth steam passage having a volume nW at a flow rate $v=V/n$, at the same time when the first portion flows into the first steam passage, flows out of the nth steam passage after lapse of time $nt1$.

In this way, the portions of steam flowing into all the steam passages at the same time, i.e., the portions of steam having substantially equal wetness, flow out of the respective steam passages after a lapse of different time periods and are then joined and mixed together at the outlet hole. As a result, steam having flowed into the steam fluctuation suppressing device is effectively time-lag mixed, so that the wetness fluctuation of steam is suppressed. While the volume ratio between the steam passages is a ratio of integers in this embodiment, any desired volume ratio can be selected without limitation to such a ratio of integers. Also, some of the steam passages may have equal volume when necessary.

The shape of the tank 50 of the above-described steam fluctuation suppressing device is not limited to a cylindrical shape. Any other various shapes can be employed including a prismatic shape and a spherical shape in addition to the cylindrical shape. Though the cylindrical partition walls 51 forming the cells in the tank 50 are arranged concentrically, the partition walls 32 may be arranged eccentrically without limitation to such a concentric arrangement. Each of the steam passages need not necessarily have a uniform sectional shape in the direction of the flow of steam. The sectional shape may be scaled up or down, or each passage need not be straight but may be curved or meandered. The steam fluctuation suppressing device may employ any other suitable structure without limitation to the structure of the steam fluctuation suppressing device 45 shown in FIG. 9A.

Figure 10:
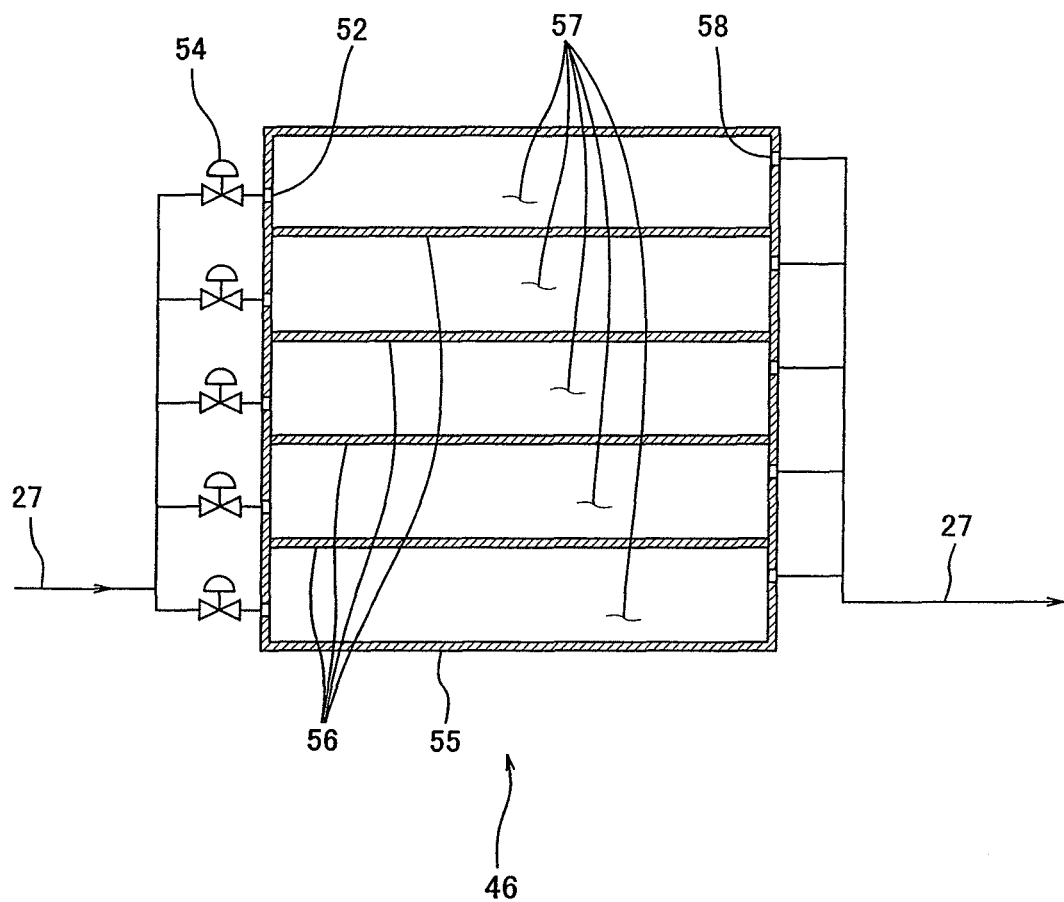
FIG. 10 is a vertical sectional view showing another example of a steam fluctuation suppressing device which can be provided in the integrated solar combined cycle electric power generation system shown in FIG. 8.

For example, a steam fluctuation suppressing device 46 shown in FIG. 10 includes plural lateral partition walls 56 spaced vertically from each other to partition the internal space of a tank 55 into plural steam passages (cells) 57. The lateral partition walls 56 are so spaced from each other that all the cells 57 have substantially equal volume. Each of the cells 57 has one end defining an inlet hole 52 and an opposite end defining an outlet hole 58. The inlet hole 52 and the outlet hole 58 are not opposed to each other, and the outlet hole 58 is formed offset from the central axis of the inlet hole 52. This arrangement is capable of preventing a portion of steam flowing into each cell 57 through the inlet hole 52 from flowing out through the outlet hole in a very short time, thereby causing the steam to reside within the cell 57 as long as possible. Though not shown, such offset positioning of the outlet hole 58 from the central axis of the inlet hole 52 is applicable to the cells or tanks shown in other figures without limitation to the steam fluctuation suppressing device 46 shown in FIG. 10.

While the cells 57 are partitioned with the lateral partition walls 56, the present invention is not limited to this arrangement. For example, it is possible to use vertically extending partition walls to partition cells or to form square cells partitioned in a matrix pattern or cells partitioned to form a honeycomb structure. Alternatively, a partition may be made to form cells arranged radially like a sectional view of a citrus fruit.

The steam fluctuation suppressing device 46 is connected to the upstream side portion of the steam supply piping 27 in the same manner as in FIG. 9A; specifically, the plural inlet holes 52 are each connected to a respective one of branch pipings branched off from the upstream side portion of the steam supply piping 27, each branch piping provided with a flow control valve 54. The openings of the flow control valves 54 are controlled so as to allow portions of steam to flow into the respective cells 57 at different flow rates. Also, the downstream side portion of the steam supply piping 25 is branched into branch pipings each connected to a respective one of the plural outlet holes 58, as shown in FIG. 10. Streams of steam that have flowed out of the respective cells 57 with time-lags begin to be mixed together in the unified portion of the steam supply piping 27. To accelerate mixing of steam, this unified piping portion may be provided with a mixing device or a stirring device. As described with respect to the steam fluctuation suppressing device 45 shown in FIG. 9A, the steam fluctuation suppressing device 46 also allows steam having flowed thereinto to be effectively time-lag mixed, thereby suppressing the wetness fluctuation of steam.

Even in the steam fluctuation suppressing device 46 having plural cells vertically arranged in tiers as shown in FIG. 10, it is possible that, for example, the plural cells have different kinds of volume and portions of steam are made to flow into the respective cells at substantially equal flow rate. In this case, the inlet of each cell need not necessarily be provided with the flow control valve. Such a steam fluctuation suppressing device also can effectively time-lag mix steam having flowed thereinto, thereby suppressing the wetness fluctuation of steam.

The steam fluctuation suppressing device according to the present invention is not limited to the type shown in FIG. 9A or 10 having plural cells within a single tank, but may comprise plural independent containers.

Figure 11:
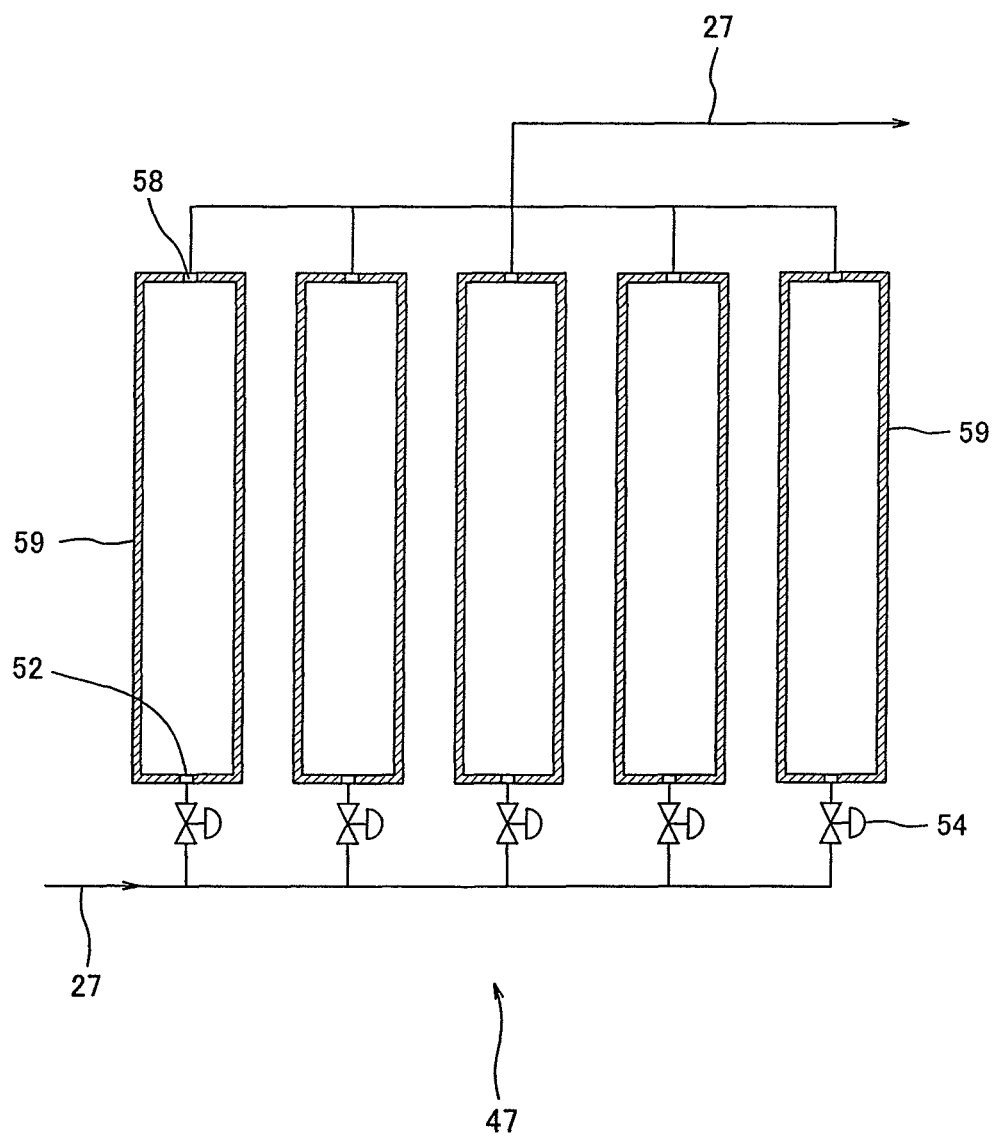
FIG. 11 is a vertical sectional view showing yet another example of a steam fluctuation suppressing device which can be provided in the integrated solar combined cycle electric power generation system shown in FIG. 8.

FIG. 11 shows such a steam fluctuation suppressing device 47 comprising plural independent containers 59. The containers 59 form respective cells (steam passages) and have substantially equal volume. Each of the containers 59 is formed with an inlet hole 52 at its bottom (or at its top or sidewall) and a steam outlet hole 58 at its top (or at its bottom or sidewall).

The inlet holes 52, which are like the corresponding ones shown in FIG. 9A or 10, are each connected to a respective one of branch pipings branched off from the upstream side portion of the steam supply piping 27, the branch pipings each provided with a flow control valve 54. The respective flow control valve 54 is controlled so as to allow each portion of steam to flow into the respective cell 59 at different flow rates. The outlet holes 58, which are like the corresponding ones shown in FIG. 10, are each connected to a respective branch piping branched off from the downstream side portion of the steam supply piping 27. Streams of steam that have flowed out of the respective cells 59 at time-lags begin being mixed together in the unified downstream side portion of the steam supply piping 27. To accelerate mixing of steam, this unified portion of the steam supply piping 27 may be provided with a mixing device or a stirring device. The steam fluctuation suppressing device 47 also can effectively time-lag mix steam having flowed thereinto, thereby suppressing the wetness fluctuation of steam. Further, since each of the steam passages comprises an independent single container, it is possible to eliminate partition walls for partitioning the tank into cells, hence, making it easy to manufacture the steam fluctuation suppressing device.

Even in the steam fluctuation suppressing device having plural independent containers 59 as the steam passages as shown in FIG. 11, it is possible that, for example, the plural containers have different kinds of volume and portions of steam are made to flow into the respective steam passages at substantially equal flow rate. In this case, the inlet of each cell need not necessarily be provided with the flow control valve. Such a steam fluctuation suppressing device also can effectively time-lag mix steam having flowed thereinto, thereby suppressing the wetness fluctuation of steam. There is no limitation to the shape of each of the above-described containers 59. Each container 59 may have any of various shapes such as a cylindrical shape, a prismatic shape, and a spherical shape. Since a single independent container forms each of the steam passages, the containers can be made to have different kinds of volume easily. The containers can be formed by using piping sections having different diameters or different lengths, or like materials.

Figure 12A:
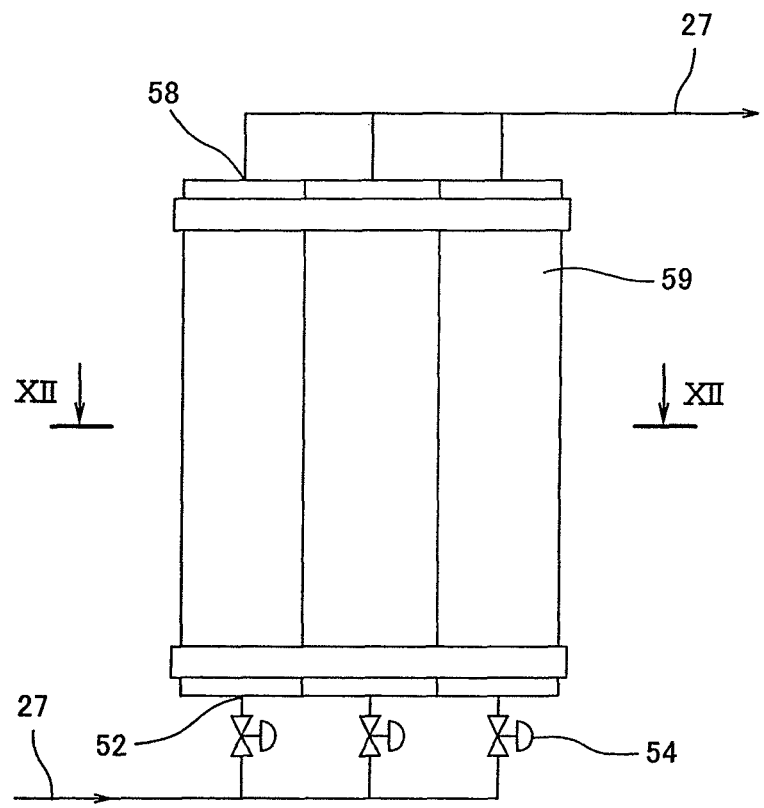
FIG. 12A is a front elevational view showing yet another example of a steam fluctuation suppressing device which can be provided in the integrated solar combined cycle electric power generation system shown in FIG. 7.
Figure 12B:
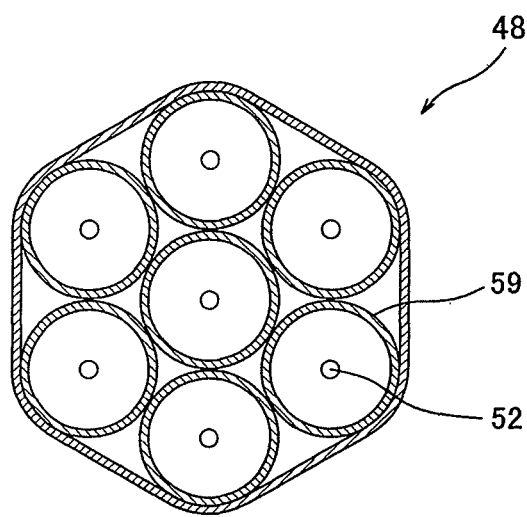
FIG. 12B is a sectional view taken on line XII-XII of FIG. 12A.

A steam fluctuation suppressing device 48 shown in FIGS. 12A and 12B comprises the containers 59 assembled together as shown. The steam fluctuation suppressing device 48 has substantially the same structure as the steam fluctuation suppressing device 47 shown in FIG. 11 except that the plural containers 59 are compactly assembled. For this reason, the same characters are used to designate similar parts throughout FIG. 11 and FIGS. 12A and 12B in order to omit detailed description thereof. This steam fluctuation suppressing device 48 can reduce the installation space therefor.

Figure 13:
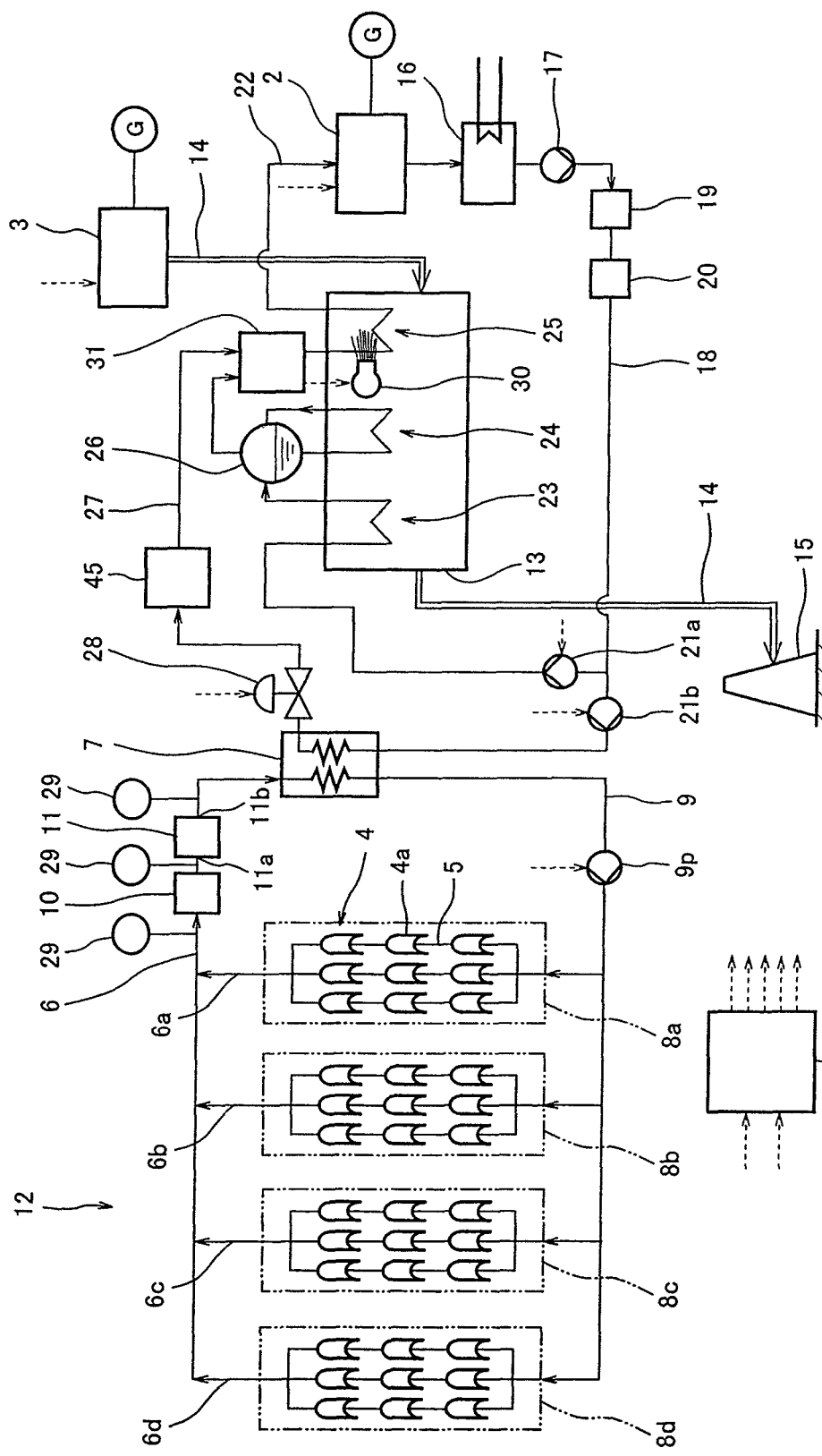
FIG. 13 is a piping diagram schematically illustrating yet another embodiment of an integrated solar combined cycle electric power generation system according to the present invention.

An electric power generation system shown in FIG. 13 is a system constructed by providing the electric power generation system shown in FIG. 6 with the above-described steam fluctuation suppressing device 45 (or 46, 47 or 48). This electric power generation system is the same as the electric power generation system shown in FIG. 6 except the feature that the steam supply piping 27 is provided with the steam fluctuation suppressing device 45. For this reason, the same characters are used to designate similar elements, except the steam fluctuation suppressing device 45, throughout FIGS. 6 and 13 in order to omit the description thereof.

In this electric power generation system, saturated steam from the heat exchanging device 7 having a wetness fluctuation suppressed by passage of steam through the steam fluctuation suppressing device 45 is mixed with saturated steam having a stabilized wetness generated by the waste heat recovery boiler 13 within the steam mixer 31 located downstream. Accordingly, the superheater 25 and the auxiliary burner 30, which are located downstream of the steam mixer 31 for superheating steam, can perform their respective operations stably.

Figure 14:
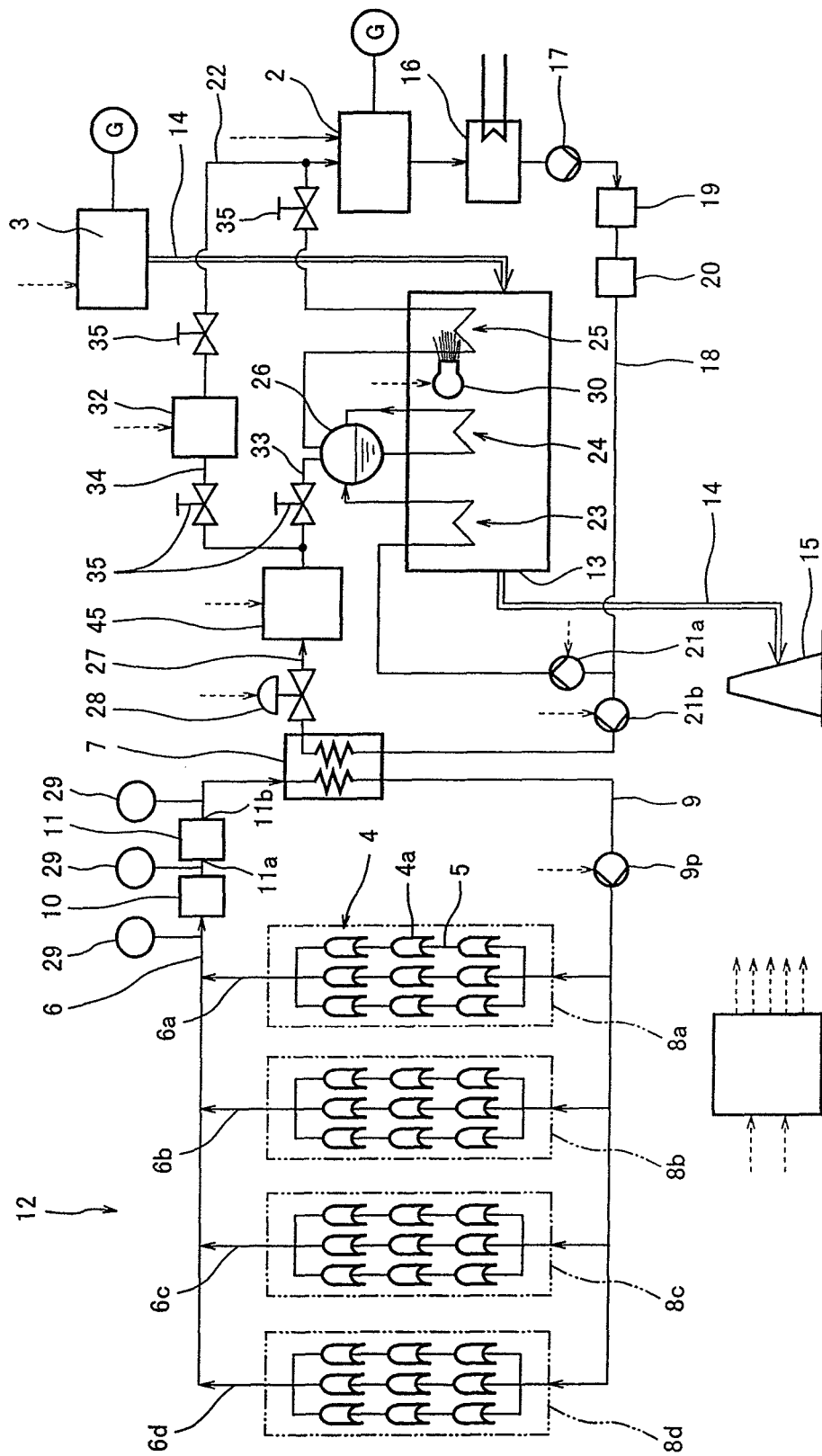
FIG. 14 is a piping diagram schematically illustrating yet another embodiment of an integrated solar combined cycle electric power generation system according to the present invention.
Figure 15:
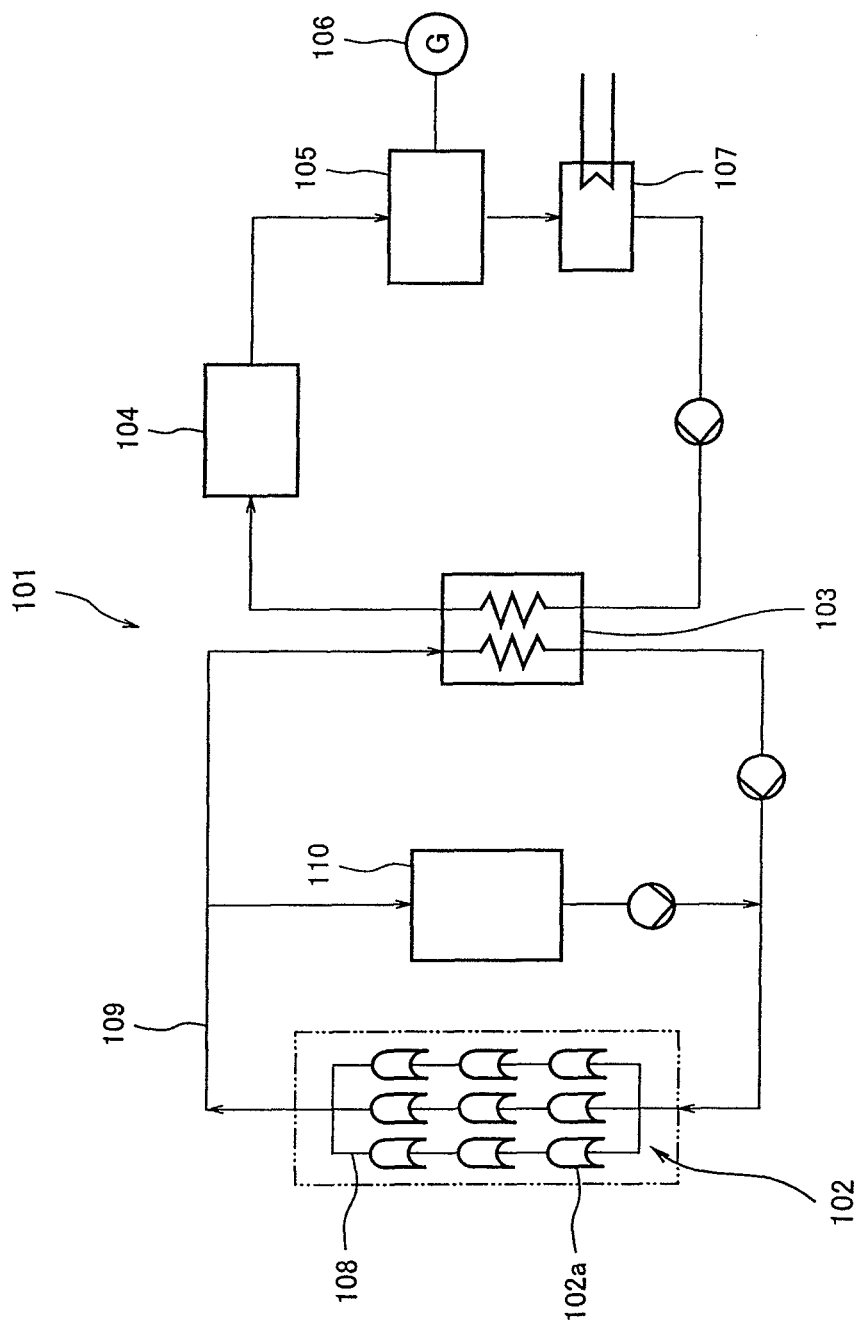
FIG. 15 is a piping diagram schematically illustrating one example of a conventional solar thermal electric power generation system.
Figure 16:
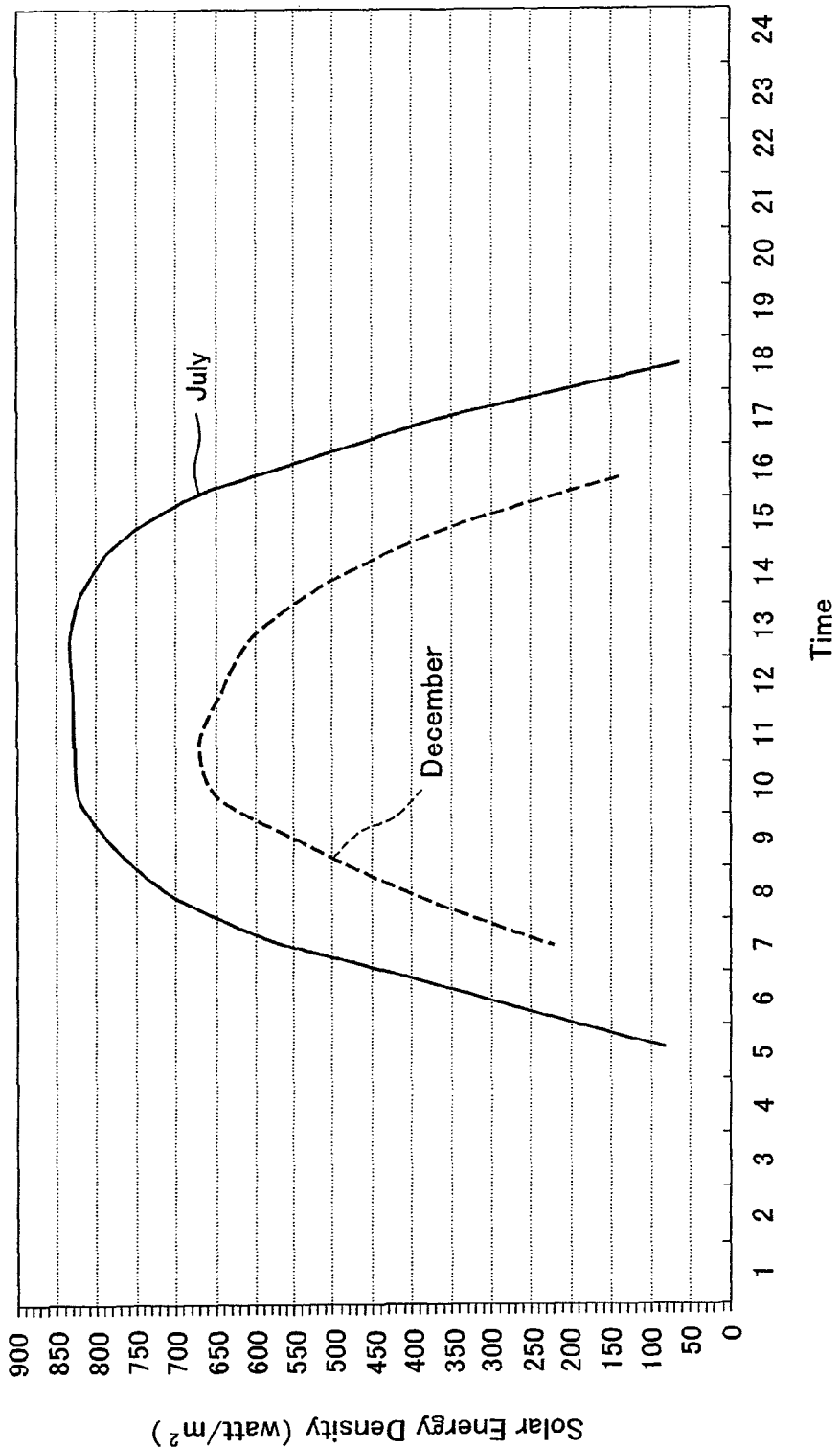
FIG. 16 is a graph plotting the solar energy density variance with time during one day.

An electric power generation system shown in FIG. 14 is a system constructed by providing the electric power generation system shown in FIG. 7 with the above-described steam fluctuation suppressing device 45 (or 46, 47 or 48). In this electric power generation system, the steam supply piping 27 is provided with the steam fluctuation suppressing device 45 at a location upstream of the branch point of the first and second steam supply pipings 33 and 34 and downstream of the flow control valve 28. This electric power generation system is the same as the electric power generation system shown in FIG. 7 except the provision of the steam fluctuation suppressing device 45. For this reason, the same characters are used to designate similar elements, except the steam fluctuation suppressing device 45, throughout FIGS. 7 and 14 in order to omit the description thereof.

In this electric power generation system, saturated steam having a wetness fluctuation suppressed by passage of steam through the steam fluctuation suppressing device 45 is mixed with saturated steam having a stabilized wetness generated by the waste heat recovery boiler 13 within the steam drum 26 located downstream of the first steam piping 33. Accordingly, the superheater 25 and the auxiliary burner 30, which are located downstream of the steam drum 26 for superheating steam, can perform their respective operations stably. Also, the superheating device 32 located downstream of the second steam supply piping 34 turns saturated steam having a wetness fluctuation suppressed by the steam fluctuation suppressing device 45 into superheated steam and, hence, its operating condition is stabilized.

While all of the foregoing electric power generation systems are each provided with the heating medium mixer 11 and the auxiliary burner 30 of the waste heat recovery boiler 13 as shown in FIGS. 1, 6-8, 13 and 14, the provisions of the mixer 11 and the burner 30 are not necessarily needed. Nevertheless, the provision of the heating medium mixer 11 in addition to the heating medium heater 10 makes it possible to further enhance the effect of suppressing the temperature fluctuation of the heating medium. The provision of the burner 30 in addition to the steam fluctuation suppressing device 45 makes it possible to enhance the effect of suppressing the fluctuation of steam condition. Therefore, the provision of the heating medium mixer 11 or the auxiliary burner 30 as an auxiliary device is preferable.

The heating medium heaters 10, 38, 39 and 41 (FIGS. 2 to 5B) described above may be provided alone. Alternatively, these heaters of the same type and/or different types may be provided in combination in a serial arrangement or a parallel arrangement. Likewise, the steam fluctuation suppressing devices 45 to 48 (FIGS. 9A to 12B) described above may be provided alone. Alternatively, these devices of the same type and/or different types may be provided in combination in a serial arrangement or a parallel arrangement.

While the foregoing embodiments are each directed to an integrated solar combined cycle electric power generation system using gas turbine as well as steam turbine, the heating medium supply system 12 is applicable not only to an integrated solar combined cycle electric power generation system but also to other electric power generation systems applying a steam turbine which is not combined with any gas turbine. Besides these electric power generation systems, the heating medium supply system is applicable to any system which is inevitably accompanied with temperature fluctuation of the heating medium.

While the heat collecting units illustrated above comprises reflectors 4a of the parabolic trough type, it is possible to employ a heat collecting unit comprising reflectors of any other type than the parabolic trough type or a heat collecting unit of the so-called central tower type.

It should be noted that the present invention is not limited to the foregoing embodiments which are only illustrative and may be variously modified without departing from the concept of the present invention.

It will be apparent from the foregoing description that various modifications and other embodiments of the present invention may occur to those skilled in the art. Therefore, the foregoing description should be construed as being based on the attached drawings and is provided for the purpose of teaching those skilled in the art to become capable of carrying out the present invention. The details of the structures and functions described above can be modified substantially without departing from the spirit of the present invention. Accordingly, such modifications and changes should be construed as being included within the scope of the present invention.

INDUSTRIAL APPLICABILITY

The present invention makes it possible to suppress or lessen a temperature fluctuation of a liquid heating medium which is supplied to a heat exchanging device while fluctuating in temperature in such a system as a solar thermal electric power generation system by a simple construction. Therefore, the present invention is useful for a system which conducts electric power generation or the like using a heating medium of which temperature fluctuation is inevitable.

The invention claimed is:

1. A heating medium supply system comprising:
 a heating system configured to heat a liquid heating medium by sunlight;
 a heat exchanging device configured to heat water supplied thereto by means of the heating medium supplied thereto from said heating system;
 a heating medium supply passage for supplying the heating medium from said heating system to said heat exchanging device; and
 a heater for heating the heating medium and a temperature measuring device configured to measure a temperature of the heating medium, which are provided on said heating medium supply passage,
 wherein the heating medium supply passage is provided with a temperature fluctuation suppressing device for suppressing a temperature fluctuation of the heating medium, the temperature fluctuation suppressing device being provided in a flow path of the heating medium, downstream in a heating medium flow direction of the heater on the heating medium supply passage;
 wherein the temperature fluctuation suppressing device has plural heating medium passages allowing the heating medium to pass therethrough, and an inlet and an outlet for the heating medium;
 whereby the heating medium flowing into said temperature fluctuation suppressing device from said heating medium supply passage through said inlet is allowed to pass through said plural heating medium passages at time-lags to form respective streams, which are then joined together before flowing out of said temperature fluctuation suppressing device into said heating medium supply passage through said outlet.

2. The heating medium supply system according to claim 1, wherein said heater is configured to operate so that the temperature of the heating medium to be measured by said temperature measuring device does not fall below a predetermined temperature.

3. A solar thermal electric power generation system comprising:
 a steam turbine;
 a heating medium supply system having a heat exchanging device for generating steam to be supplied to said steam turbine and configured to supply said heat exchanging device with a heating medium for heating water therein; and
 a steam supply passage for supplying steam from said heat exchanging device to said steam turbine, wherein
 said heating medium supply system is a heating medium supply system as recited in claim 1.

4. The solar thermal electric power generation system according to claim claim 3, further comprising: a gas turbine; and a waste heat recovery boiler configured to generate steam by utilizing waste heat of said gas turbine and supply steam thus generated to said steam turbine, wherein:
 said waste heat recovery boiler comprises an evaporating section having a steam drum and a superheating section; and
 steam generated by heating of water supplied to said waste heat recovery boiler is supplied to said steam turbine.

5. The solar thermal electric power generation system according to claim 4, wherein said steam supply passage interconnects said heat exchanging device of said heating medium supply system and said steam drum to allow steam from said heat exchanging device and steam generated by said waste heat recovery boiler to be mixed together in said steam drum and then supplied to said steam turbine through said superheating section.

6. The solar thermal electric power generation system according to claim 4, wherein:
 said evaporating section and said superheating section are interconnected through a steam passage provided with a steam mixer; and
 said steam supply passage interconnects said heat exchanging device of said heating medium supply system and said steam mixer to allow steam from said heat exchanging device and steam generated by said waste heat recovery boiler to be mixed together in said steam mixer and then supplied to said steam turbine through said superheating section.

7. The solar thermal electric power generation system according to claim 5, wherein said superheating section is provided with a burner for heating steam.

8. The solar thermal electric power generation system according to claim 5, wherein:
said steam supply passage is branched into a first steam passage connected to said waste heat recovery boiler and a second steam passage connected to said steam turbine without passing through said waste heat recovery boiler; and
said second steam passage is provided with a superheating device for superheating steam.

9. An integrated solar combined cycle electric power generation system comprising:
a steam turbine;
a gas turbine;
a waste heat recovery boiler configured to generate steam by utilizing waste heat of said gas turbine and supply steam thus generated to said steam turbine;
a heating medium supply system having a heat exchanging device for generating steam to be supplied to said steam turbine and configured to supply said heat exchanging device with a heating medium for heating water therein;
a steam supply passage for supplying steam from said heat exchanging device to said steam turbine; and
a steam fluctuation suppressing device provided in a flow path of steam travelling in said steam supply passage for suppressing a fluctuation of steam condition, wherein:
said steam fluctuation suppressing device has plural steam passages allowing steam to pass therethrough, and an inlet and an outlet for steam, whereby steam flowing into said steam fluctuation suppressing device from said steam supply passage through said inlet is allowed to pass through said plural steam passages at time-lags to form respective streams, which are then joined together before flowing out of said steam fluctuation suppressing device into said steam supply passage through said outlet; and
said heating medium supply system further comprises a heating system configured to heat a liquid heating medium by sunlight, and a heating medium supply passage for supplying the heating medium from said heating system to said heat exchanging device.

10. The integrated solar combined cycle electric power generation system according to claim 9, wherein said heating medium supply system is a heating medium supply system comprising:
a heating system configured to heat a liquid heating medium by sunlight;
a heat exchanging device configured to heat water supplied thereto by means of the heating medium supplied thereto from said heating system;
a heating medium supply passage for supplying the heating medium from said heating system to said heat exchanging device; and
a heater for heating the heating medium and a temperature measuring device configured to measure a temperature of the heating medium, which are provided on said heating medium supply passage.

11. The integrated solar combined cycle electric power generation system according to claim 10, wherein:
said waste heat recovery boiler comprises an evaporating section having a steam drum, and a superheating section;
said steam supply passage interconnects said heat exchanging device of said heating medium supply system and said steam drum to allow steam from said heat exchanging device and steam generated by said waste heat recovery boiler to be mixed together in said steam drum and then supplied to said steam turbine.

12. The integrated solar combined cycle electric power generation system according to claim 10, wherein:
said waste heat recovery boiler comprises an evaporating section having a steam drum, and a superheating section;
said evaporating section and said superheating section are interconnected through a steam passage provided with a steam mixer; and
said steam supply passage interconnects said heat exchanging device of said heating medium supply system and said steam mixer to allow steam from said heat exchanging device and steam generated by said waste heat recovery boiler to be mixed together in said steam mixer and then supplied to said steam turbine.

13. The integrated solar combined cycle electric power generation system according to claim 11, wherein said superheating section is provided with a burner for heating steam.

14. The integrated solar combined cycle electric power generation system according to claim 11, wherein:
said steam supply passage is branched into a first steam passage connected to said waste heat recovery boiler and a second steam passage connected to said steam turbine without passing through said waste heat recovery boiler; and
said second steam passage is provided with a superheating device for superheating steam.

15. A heating medium supply system comprising:
a heating system configured to heat a liquid heating medium by sunlight;
a heat exchanging device configured to heat water supplied thereto by means of the heating medium supplied thereto from the heating system;
a heating medium supply passage for supplying the heating medium from the heating system to the heat exchanging device; and
a heater for heating the heating medium and a temperature measuring device configured to measure a temperature of the heating medium, which are provided on the heating medium supply passage,
wherein the heater has plural heating medium passages allowing the heating medium to pass therethrough, an inlet and an outlet for the heating medium, and heating means for heating the heating medium passing through the plural heating medium passages;
whereby the heating medium flowing into the heater from the heating medium supply passage through the inlet is allowed to pass through the plural heating medium passages at time-lags to form respective streams, which are then joined together before flowing out of the heater into the heating medium supply passage through the outlet.

16. The heating medium supply system according to claim 15, wherein said heater is configured to operate so that the temperature of the heating medium to be measured by said temperature measuring device does not fall below a predetermined temperature.

17. A solar thermal electric power generation system comprising:
a steam turbine;
a heating medium supply system having a heat exchanging device for generating steam to be supplied to said steam turbine and configured to supply said heat exchanging device with a heating medium for heating water therein; and a steam supply passage for supplying steam from said heat exchanging device to said steam turbine, wherein said heating medium supply system is a heating medium supply system as recited in claim 15.

* * * * *

UNITED STATES PATENT AND TRADEMARK OFFICE
CERTIFICATE OF CORRECTION

PATENT NO. : 8,468,827 B2
APPLICATION NO. : 12/376758
DATED : June 25, 2013
INVENTOR(S) : Hideaki Ota It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1173 days.

Signed and Sealed this
Eighth Day of September, 2015

Michelle K. Lee
*Director of the United States Patent and Trademark Office*